United States Patent
Amakawa et al.

(10) Patent No.: US 9,644,870 B2
(45) Date of Patent: May 9, 2017

(54) ENGINE DRIVEN HEAT PUMP

(71) Applicant: YANMAR CO., LTD., Osaka-shi (JP)

(72) Inventors: Shohei Amakawa, Osaka (JP); Masaya Horibe, Osaka (JP); Kyoko Hashimoto, Osaka (JP)

(73) Assignee: YANMAR CO., LTD., Osaka-shi (JP)

( * ) Notice: Subject to any disclaimer, the term of this patent is extended or adjusted under 35 U.S.C. 154(b) by 386 days.

(21) Appl. No.: 14/489,755

(22) Filed: Sep. 18, 2014

(65) Prior Publication Data

US 2015/0075198 A1 Mar. 19, 2015

(30) Foreign Application Priority Data

Sep. 18, 2013 (JP) .................................. 2013-193237

(51) Int. Cl.
  F25B 27/00 (2006.01)
  F02B 63/00 (2006.01)
  F25B 30/02 (2006.01)
  F25B 49/02 (2006.01)

(52) U.S. Cl.
  CPC ............ *F25B 27/00* (2013.01); *F25B 49/022* (2013.01); *F02B 63/00* (2013.01); *F25B 30/02* (2013.01); *F25B 2327/00* (2013.01); *F25B 2600/021* (2013.01); *Y02B 30/741* (2013.01)

(58) Field of Classification Search
  None
  See application file for complete search history.

(56) References Cited

U.S. PATENT DOCUMENTS

2015/0184913 A1* 7/2015 Hashimoto ........... F25B 49/025
  62/228.1

FOREIGN PATENT DOCUMENTS

JP          4682558 B2     5/2011

\* cited by examiner

*Primary Examiner* — Jared Fureman
*Assistant Examiner* — Swarna N Chowdhuri
(74) *Attorney, Agent, or Firm* — Locke Lord LLP

(57) ABSTRACT

An engine driven heat pump is such that when a self-sustaining switch is turned on during power failure, and a self-sustaining signal is received, it switches to a self-sustaining mode and start an engine and a generator, and when output power from an inverter is received, it supplies the output power to a power supply circuit and a battery charging circuit by means of an independent power supply relay, and it supplies the output power to the outside via an independent output unit, and during the supply of the output power, it maintains cutoff with respect to connection between a system, and the power supply circuit and the battery charging circuit by means of a system cutoff relay and maintain the output of the output power until the self-sustaining signal is interrupted, and it recovers the connection when power is restored and the output power is interrupted.

3 Claims, 21 Drawing Sheets

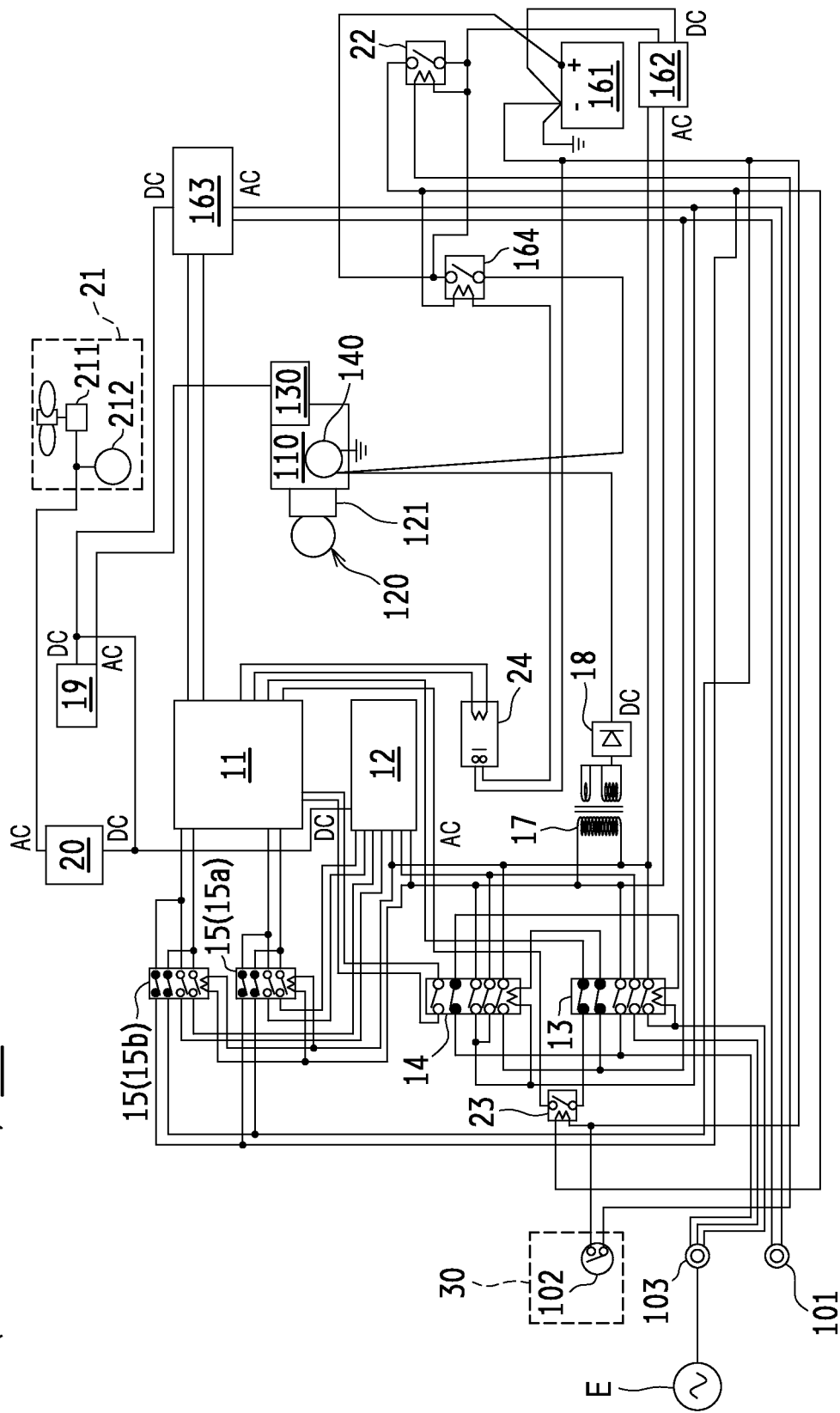
FIG.3 (FIRST EMBODIMENT) 100

FIG. 4

| | (Step 5→)Step 1 | Step 2 | Step 3 | Step 4 | Step 5(→Step 1) |
|---|---|---|---|---|---|
| | Fig. 5 \| Fig. 6 \| Fig. 7 | Fig. 3 | Fig. 8 \| Fig. 9 | Fig. 10 \| Fig. 11 | Fig. 12 \| Fig. 13 |
| Self-sustaining Switch | OFF | | | ON | |
| Supply of Alternating Current Power | System Power | | Power Failure | | Output Power from Inverter |
| Supply of Direct Current Power (for CONTROL) | — \| Power Supply Circuit | — | — | Engine Actuation Battery | — \| Power Supply Circuit |
| Engine 110 | Stop \| Operate | | Stop | Actuate | Operate |
| System Cutoff Relay 13 | Excitation (A:Closed, B:Open) | | Non-excitation (A:Open, B:Closed) | | |
| Independent Power Supply Relay 14 | Non-excitation (A:Open) | | | Excitation (A:Closed) | Excitation (A:Closed, B:Open) |
| Battery Relay 22 | Non-excitation (A:Open) | | | Excitation (A:Closed) | |
| Starter Relay 164 | Non-excitation (A:Open) | | | Excitation (A:Closed) | Non-excitation (A:Open) |
| Control Power Supply Relay 15a | Excitation (A:Closed, B:Open) | | Non-excitation (A:Open, B:Closed) | | Excitation (A:Closed, B:Open) |
| Ignition Power Supply Relay 15b | Excitation (A:Closed, B:Open) | | Non-excitation (A:Open, B:Closed) | | Excitation (A:Closed, B:Open) |
| Inverter 163 | Non-operation | | | | Operation |
| Operational Mode of Control Unit | — \| Ordinary Operational Mode | — | | Self-sustaining Mode | |
| | During Supply of System Power ⇧ Power Failure | ⇧ Power Failure | During Power Failure | | During Self-sustaining Operation ⇧ Power Restoration |

(FIRST PROCESS DURING SUPPLY OF SYSTEM POWER)

(SECOND PROCESS DURING SUPPLY OF SYSTEM POWER)

FIG.7 (THIRD PROCESS DURING SUPPLY OF SYSTEM POWER)

FIG.8 (FIRST PROCESS DURING POWER FAILURE)

FIG.9 (SECOND PROCESS DURING POWER FAILURE)

(THIRD PROCESS DURING POWER FAILURE)

(FIRST PROCESS DURING SELF-SUSTAINING OPERATION)

FIG.12 (SECOND PROCESS DURING SELF-SUSTAINING OPERATION)

(THIRD PROCESS DURING SELF-SUSTAINING OPERATION)

FIG.14 (SECOND EMBODIMENT)

FIG.15 (DURING SELF-SUSTAINING OPERATION IN SECOND EMBODIMENT)

FIG.16 (POWER RESTORATION IN SECOND EMBODIMENT)

(THIRD EMBODIMENT)

FIG.18 (THIRD EMBODIMENT)

FIG.19 (SELF-HOLDING STATE OF SELF-HOLDING-TYPE SELF-SUSTAINING SWITCH)

FIG.20 (SELF-HOLDING STATE OF SELF-HOLDING-TYPE SELF-SUSTAINING SWITCH IS AUTOMATICALLY RELEASED WHEN POWER IS RESTORED)

(SELF-HOLDING STATE OF SELF-HOLDING-TYPE SELF-SUSTAINING SWITCH IS MANUALLY RELEASED DURING NON-RESTORATION OF POWER)

US 9,644,870 B2

ENGINE DRIVEN HEAT PUMP

INCORPORATION BY REFERENCE REGARDING APPLICATION AND PRIORITY

This nonprovisional application claims priority under U.S.C. 119(a) on Patent Application No. 2013-193237 filed in Japan on Sep. 18, 2013, the entire contents of which are hereby incorporated by reference.

BACKGROUND OF THE INVENTION

Field of the Invention

The present invention relates to an engine driven heat pump in which heat exchange is performed by use of a refrigerant, which is sucked and discharged by a compressor driven by an engine, thereby flowing through a refrigerant circuit.

Description of the Related Art

Conventionally, it has been known that a generator is mounted in the engine driven heat pump in which heat exchange is performed by use of a refrigerant, which is sucked and discharged by a compressor driven by the engine, thereby flowing through a refrigerant circuit (see, for example, Japanese Patent No. 4682558).

Japanese Patent No. 4682558 discloses that the engine driven heat pump, in which the generator is mounted, is used as a power supply device at the time of power failure.

However, Japanese Patent No. 4682558 discloses that the engine driven heat pump, in which the generator is mounted, is used as the power supply device during power failure, Japanese Patent No. 4682558 fails to disclose any specific operational constitution which is applied in the event of power failure and power restoration.

SUMMARY OF THE INVENTION

The present invention provides an engine driven heat pump, in which a generator is mounted, the engine driven heat pump configured to be used as a power supply device during power failure and configured to provide operational constitution which is applied in the event of power failure and power restoration.

According to one aspect of the present invention, an engine driven heat pump includes an engine, a compressor configured to be driven by the engine, a refrigerant circuit configured to flow a refrigerant sucked and discharged by the compressor, a generator configured to be driven by the engine, an engine actuation battery configured to actuate the engine, a battery charging circuit configured to charge the engine actuation battery, an inverter configured to convert output power from the generator into a predetermined voltage and a predetermined frequency, a power supply circuit configured to supply power to electric instruments in the engine driven heat pump, a system cutoff relay configured to supply system power from a system to the power supply circuit and the battery charging circuit, whereas the system cutoff relay configured to cut off connection between the system and, the power supply circuit and the battery charging circuit during power failure, an independent power supply relay configured to connect in parallel to the system cutoff relay with respect to the power supply circuit and the battery charging circuit and configured to supply output power from the inverter to the power supply circuit and the battery charging circuit during the power failure, an engine starter configured to start the engine, a starter relay configured to be connected between the engine starter and the engine actuation battery and supply battery power from the engine actuation battery to the engine starter, a self-sustaining switch configured to manually switch ON and OFF of a self-sustaining signal indicating a self-sustaining operation, and an independent output unit configured to be connected in parallel to the independent power supply relay with respect to the inverter, and wherein it is configured to switch to a self-sustaining mode at which the engine is driven, irrespective of a request of a heat pump operation (for example, air conditioning), and wherein when the self-sustaining switch is turned on during the power failure, and the self-sustaining signal is received, it is configured to switch to the self-sustaining mode and bring the starter relay into conduction for a predetermined period of time, thereby starting the engine and the generator, and when the output power from the inverter is received after establishment of a voltage of the generator, it is configured to supply the output power from the inverter to the power supply circuit and the battery charging circuit by means of the independent power supply relay, and it is configured to supply the output power from the inverter to outside of the engine driven heat pump via the independent output unit, and wherein during supply of the output power from the inverter, it is configured to maintain cutoff with respect to the connection between the system, and the power supply circuit and the battery charging circuit by means of the system cutoff relay and maintain output of the output power from the inverter until the self-sustaining signal is interrupted, and wherein it is configured to recover the connection between the system, and the power supply circuit and the battery charging circuit by means of the system cutoff relay when power is restored and the output power from the inverter is interrupted.

According to another aspect of the present invention, a mode can be exemplified where constitution is provided, in which when the power is restored, an output instruction signal to the inverter is turned off, and when the output power from the inverter is interrupted, the connection between the inverter, and the power supply circuit and the battery charging circuit is cut off by means of the independent power supply relay.

According to another aspect of the present invention, a mode can be exemplified where it is configured to self-hold the self-sustaining switch, whereas it is configured to automatically release self-holding of the self-sustaining switch when the power is restored.

According to another aspect of the present invention, with respect to the engine driven heat pump, which includes a generator and is used as a power supply device during power failure, the engine driven heat pump can provide operational constitution during power failure and power restoration.

BRIEF DESCRIPTION OF THE DRAWINGS

FIG. 3 is a detailed diagram of the electric circuit in the engine driven heat pump according to the first embodiment.

FIG. 4 is a timing chart illustrating the specific circuit operation of the engine driven heat pump according to the first embodiment.

DESCRIPTION OF THE PREFERRED EMBODIMENT

Hereinafter, the embodiment of the present invention will be described referring to drawings.

Figure 1:
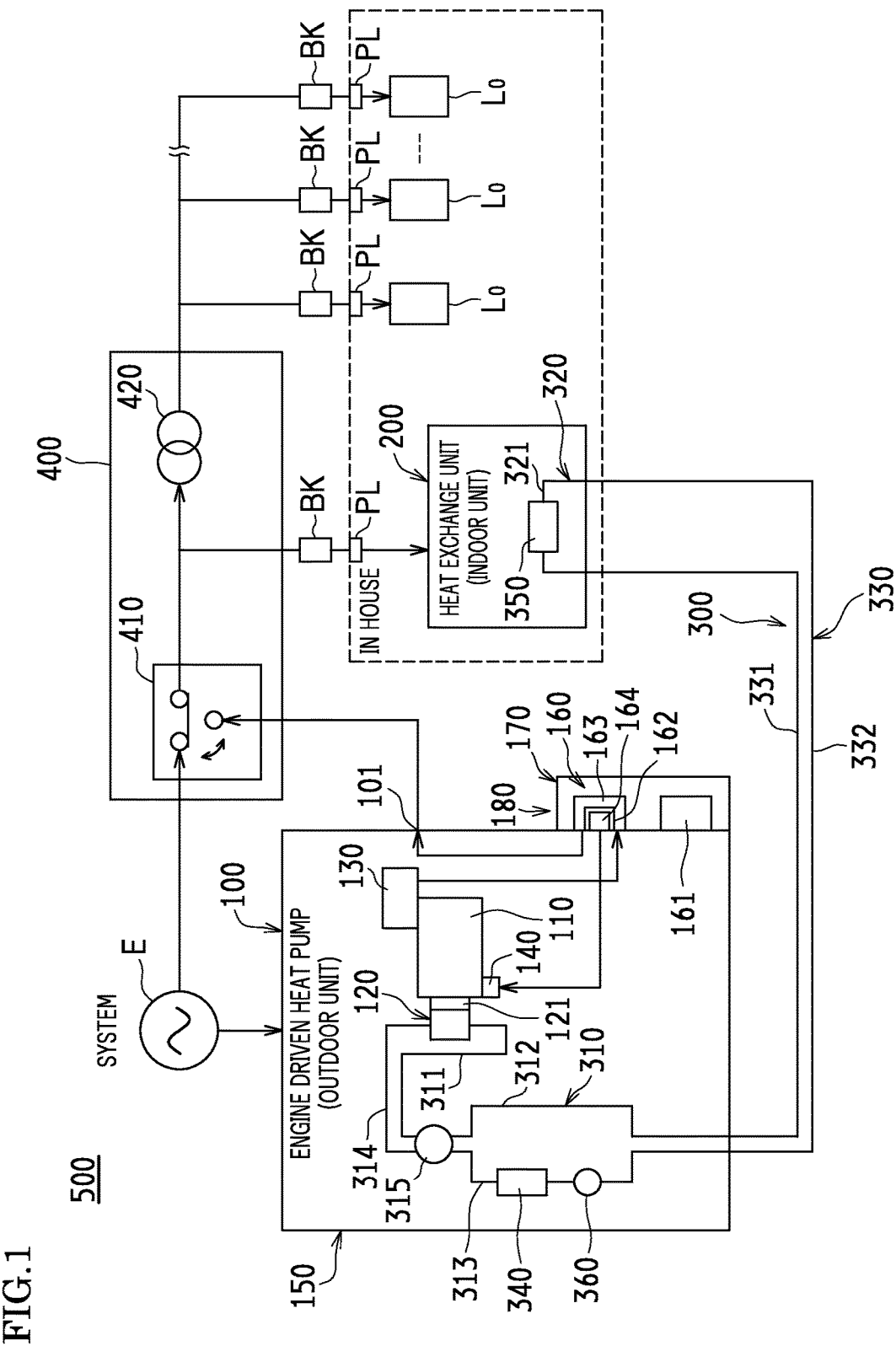
FIG. 1 is a schematic block diagram illustrating one example of a heat exchange system including an engine driven heat pump according to the embodiment of the present invention.

FIG. 1 is a schematic block diagram illustrating one example of a heat exchange system 500 including an engine driven heat pump 100 according to the embodiment of the present invention.

The heat exchange system 500 illustrated in FIG. 1 is provided in such a manner that a refrigerant is circulated through a refrigerant circulation path 300 while a state where the refrigerant is decompressed and brought down to a low temperature and a state where the refrigerant is pressurized and brought up to a high temperature are alternated by means of the engine driven heat pump 100.

The refrigerant circulation path 300 includes a first refrigerant circuit 310 (one example of a refrigerant circuit) provided in the engine driven heat pump 100 (an outdoor unit constituting an air conditioner in the example), a second refrigerant circuit 320 provided in a heat exchange unit 200 (an indoor unit constituting the air conditioner in the example), a third refrigerant circuit 330 with which the first refrigerant circuit 310 and the second refrigerant circuit 320 are communicated, a first heat exchanger 340 provided in the engine driven heat pump 100 and interposed in the first refrigerant circuit 310, a second heat exchanger 350 provided in the heat exchange unit 200 and interposed in the second refrigerant circuit 320, and an expansion valve 360 interposed in the refrigerant circuit (the first refrigerant circuit 310 in the example) provided between the first heat exchanger 340 and the second heat exchanger 350.

The first refrigerant circuit 310 of the engine driven heat pump 100 includes a discharge-side first refrigerant pipe 311 that is connected to a discharge side of a compressor 120 that is driven by an engine 110, thereby sucking and discharging the refrigerant, a one-side first refrigerant pipe 312 that is connected to one side of a third refrigerant pipe 331 on the one side of the third refrigerant circuit 330, an other-side first refrigerant pipe 313 that is connected to a third refrigerant pipe 332 on the other side of the third refrigerant circuit 330, an suction-side first refrigerant pipe 314 that is connected to the suction side of the compressor 120, and a four-way valve 315. The four-way valve 315 is connected to the discharge-side first refrigerant pipe 311, the one-side first refrigerant pipe 312, the other-side first refrigerant pipe 313, and the suction-side first refrigerant pipe 314, and the four-way valve 315 is switchable in such a manner that the refrigerant from the discharge-side first refrigerant pipe 311 is guided to the one-side first refrigerant pipe 312, and the refrigerant from the other-side first refrigerant pipe 313 is guided to the suction-side first refrigerant pipe 314, or in such a manner that the refrigerant from the discharge-side first refrigerant pipe 311 is guided to the other-side first refrigerant pipe 313, and the refrigerant from the one-side first refrigerant pipe 312 is guided to the suction-side first refrigerant pipe 314. The first heat exchanger 340 is provided in the other-side first refrigerant pipe 313, and the expansion valve 360 is provided between the first heat exchanger 340 and the third refrigerant pipe 332 on the other side of the third refrigerant circuit 330 with respect to the other-side first refrigerant pipe 313. The second refrigerant circuit 320 of the heat exchange unit 200 includes a second refrigerant pipe 321 connected to the third refrigerant pipe 331 on the one side of the third refrigerant circuit 330 and the third refrigerant pipe 332 on the other side of the third refrigerant circuit 330. The second heat exchanger 350 is provided in the second refrigerant pipe 321.

With the above-mentioned constitution, when the heat exchange system 500 is utilized for heating or hot-water supply (heating in the example), the four-way valve 315 is switched in such a manner that the refrigerant from the discharge-side first refrigerant pipe 311 is guided to the one-side first refrigerant pipe 312, and the refrigerant from the other-side first refrigerant pipe 313 is guided to the suction-side first refrigerant pipe 314, and the low-temperature refrigerant is brought into indirect contact with the open air or water via the first heat exchanger 340 so as to absorb heat, and further the refrigerant is compressed by the compressor 120 and brought up to a high temperature, and air in a room or water for hot-water supply (air in a room in the example) is heated via the second heat exchanger 350. In contrast, when the heat exchange system 500 is utilized for air conditioning or cold storage (air conditioning in the example), the four-way valve 315 is switched in such a manner that the refrigerant from the discharge-side first refrigerant pipe 311 is guided to the other-side first refrigerant pipe 313, and the refrigerant from the one-side first refrigerant pipe 312 is guided to the suction-side first refrigerant pipe 314, and the high-temperature refrigerant is brought into indirect contact with the open air and the like via the first heat exchanger 340 so as to discharge heat, and further the refrigerant is decompressed through the expansion valve 360 and brought down to a low temperature, and the air in the room or a refrigerator (the room in the example) is cooled via the second heat exchanger 350.

Also, regarding the heat exchange system 500, the engine driven heat pump 100, in which a generator 130 driven by the engine 110 is mounted, is used as a power supply device in the event of power failure of a system E (specifically, commercial power supply), and the heat exchange system 500 further includes a self-sustaining switching device 400.

The self-sustaining switching device 400 includes a switching unit 410 that switches operations on whether the system E and wiring attachment connectors PL such as an attachment plug or a wall socket in a house are connected via wiring circuit breakers BK (breaker) or whether an independent output unit 101 of the engine driven heat pump 100 and the wiring attachment connectors PL in the house are connected via the wiring circuit breakers BK.

In the present embodiment, the switching unit 410 automatically switches from/to a system connection state where the system E and the wiring attachment connectors PL are connected when the system power is supplied from the system E to/from a power-failure connection state where the independent output unit 101 of the engine driven heat pump 100 and the wiring attachment connectors PL are connected when the power supply is cut off. It is noted that the switching unit 410 may switch the system connection state and the power-failure connection state in a manual manner.

Also, the self-sustaining switching device 400 further includes a transformer 420. The transformer 420 transforms 200V system voltage to 100V system voltage. The transformer 420 is provided on a connecting line between the wiring circuit breaker BK corresponding to the wiring attachment connector PL for the 200V system (connector connected to the heat exchange unit 200 in the example) and the wiring circuit breaker BK corresponding to the wiring attachment connector PL for the 100V system (in the example, a connector connected to a general load Lo such as an illuminator or a television set that is usually used).

In the present embodiment, regarding the engine driven heat pump 100, a main body package 150 stores the engine 110 (a gas engine in the example), the compressor 120 driven by the engine 110, the first refrigerant circuit 310 that flows the refrigerant sucked and discharged by the compressor 120, and the generator 130 driven by the engine 110. Specifically, a driving force from the engine 110 is transmitted to the compressor 120 via an electromagnetic clutch 121. The driving force from the engine 110 is transmitted to the generator 130 directly or indirectly via a driving transmission means not illustrated. It is noted that the engine 110 is provided as a gas engine, but not limited thereto. Engines except for the gas engine may be applied.

The engine driven heat pump 100 includes a self-sustaining power supply device 160 that includes an engine actuation battery 161 that supplies power to an engine starter 140 (specifically, a starter motor) for starting the engine 110 and actuates the engine 110, a battery charging circuit 162 (specifically, a battery charger) that charges the engine actuation battery 161, and an inverter 163 (specifically, a self-sustaining inverter) that converts the output power from the generator 130 into a predetermined voltage and a predetermined frequency. In the present embodiment, the self-sustaining power supply device 160 further includes a starter relay 164. The starter relay 164 is connected between the engine starter 140 and the engine actuation battery 161 and configured to supply battery power from the engine actuation battery 161 to the engine starter 140.

It is noted that the inverter 163 can switch two frequencies that are different from each other (specifically, 50 Hz or 60 Hz). Regarding the engine driven heat pump 100, the self-sustaining power supply device 160 is stored in a separate body package 170 that is separate from the main body package 150. A battery unit 180 is constituted by the self-sustaining power supply device 160 and the separate body package 170.

First Embodiment

Next, the electric circuit of the engine driven heat pump 100 according to the first embodiment will be described.

Figure 2:
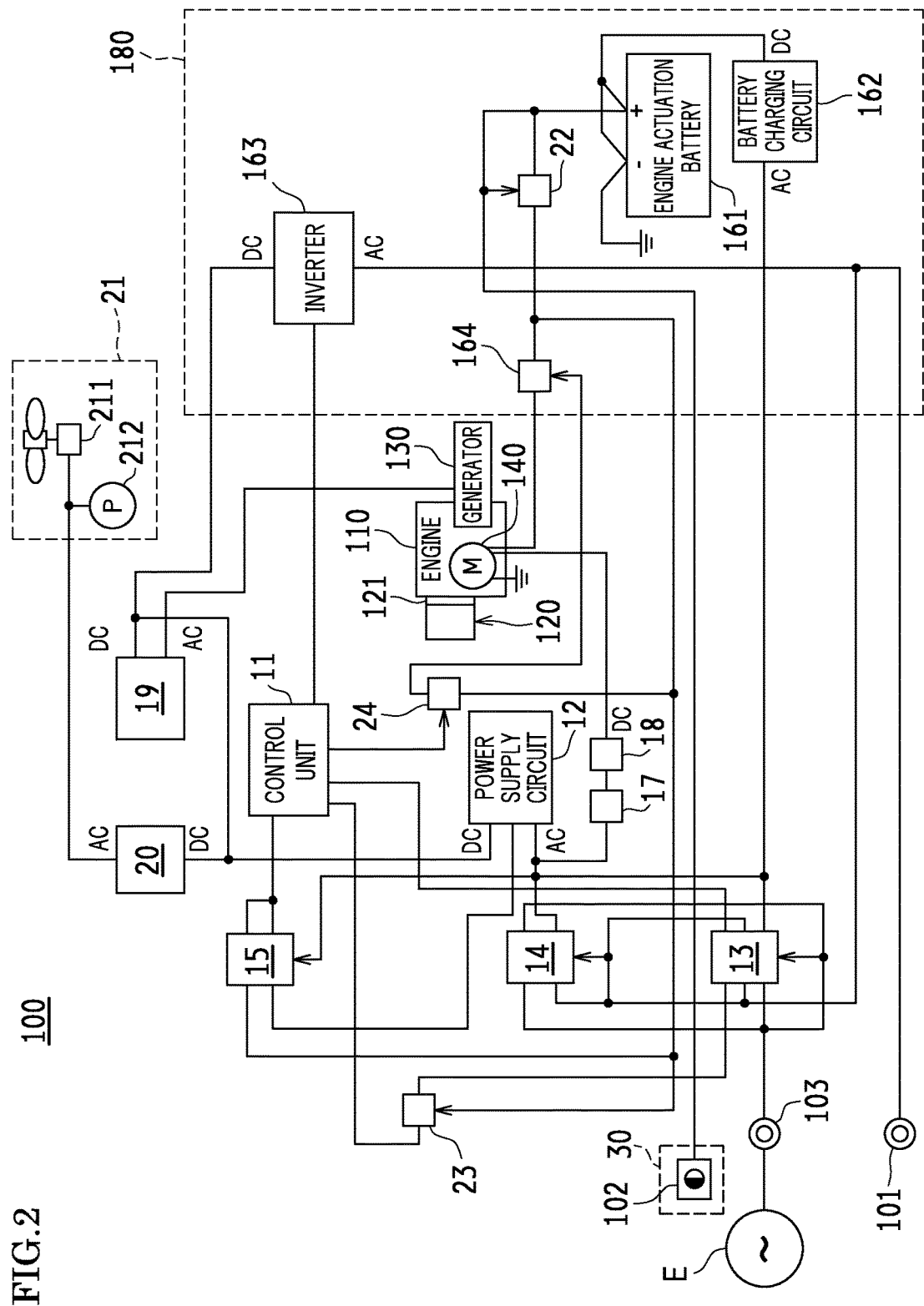
FIG. 2 is a block diagram illustrating the schematic constitution of the electric circuit of the engine driven heat pump according to a first embodiment.

FIG. 2 is a block diagram illustrating the schematic constitution of the electric circuit of the engine driven heat pump 100 according to the first embodiment.

As illustrated in FIG. 2, the engine driven heat pump 100 includes a control unit 11, a power supply circuit 12, a system cutoff relay 13, an independent power supply relay 14, and a self-sustaining switch 102, in addition to the engine 110, the compressor 120, the generator 130, the engine actuation battery 161, the battery charging circuit 162, the inverter 163, the starter relay 164, the engine starter 140, and the independent output unit 101, each of which is described above.

The control unit 11 gains the whole control of the engine driven heat pump 100 and constitutes a control board. The control unit 11 includes a processing unit (not illustrated) such as a Central Processing Unit (CPU) and a storage unit (not illustrated) that includes a nonvolatile memory such as Read Only Memory (ROM), a rewritable nonvolatile memory such as a flash memory, and a volatile memory such as Random Access Memory (RAM). In the engine driven heat pump 100, the processing unit of the control unit 11 loads a control program stored in advance in the ROM of the storage unit on the RAM of the storage unit and executes the control program, thereby controlling various constitutional elements. Also, various system information such as the operational parameters and setting data of the engine driven heat pump 100 is stored in the nonvolatile memory of the storage unit.

Then, the control unit 11 is configured to switch between an ordinary operational mode for driving the engine 110 in a case where a user's request (a user's instruction) for a heat pump operation (air conditioning in the example) is provided and a self-sustaining mode for driving the engine 110 irrespective of the request for the heat pump operation (air conditioning in the example).

The power supply circuit 12 supplies power to electric instruments (in the example, the control unit 11 and an ignition plug, not illustrated, of the engine 110) in the engine driven heat pump 100 and constitutes a power supply board. The power supply circuit 12 converts the input power of an alternating current into the output power of a direct current and serves as a power supply for the control unit 11 or as a power supply for the ignition plug of the engine 110 in the example.

The system cutoff relay 13 is configured to self-hold a closed state based on the power of the system E, connect to the system E, the power supply circuit 12, and the battery charging circuit 162, and supply the system power from the system E to the power supply circuit 12 and the battery charging circuit 162, whereas the system cutoff relay 13 is configured to fall into an open state at the time of power failure and cut off the connection between the system E, and the power supply circuit 12 and the battery charging circuit 162.

When the independent power supply relay 14 is connected in parallel with the system cutoff relay 13 with respect to the power supply circuit 12 and the battery charging circuit 162, and when the power from the system E is supplied, the independent power supply relay 14 is configured to fall into an open state and cut off the connection between the system cutoff relay 13, and the power supply circuit 12 and the battery charging circuit 162, whereas the independent power supply relay 14 is configured to self-hold a closed state based on the output power from the inverter 163 at the time of power failure, connect the inverter 163 with the power supply circuit 12 and the battery charging circuit 162, and supply the output power from the inverter 163 to the power supply circuit 12 and the battery charging circuit 162.

The self-sustaining switch 102 is configured to maintain an ON state based on a user's ON operation, whereas the self-sustaining switch 102 is configured to be turned off from the ON state based on the user's OFF operation and maintain an OFF state. More particularly, the self-sustaining switch 102 includes functions of manually switching the connection or cutoff between the engine actuation battery 161 and the control unit 11 and manually switching ON/OFF (presence and absence) of a self-sustaining signal that instructs the control unit 11 to perform a self-sustaining operation. It is noted that the self-sustaining switch 102 can be operated from a control panel 30 in a house.

In the present embodiment, the engine driven heat pump 100 further includes an input power supply relay 15.

The input power supply relay 15 is configured to supply the output power from the power supply circuit 12 to the control unit 11, whereas when the self-sustaining switch 102 is turned on at the time of power failure, the input power supply relay 15 is configured to supply the battery power from the engine actuation battery 161 to the control unit 11.

It is noted that members that are not described in FIG. 2 will be described in specific circuit constitution below.

<Regarding Specific Circuit Constitution>

Next, the specific circuit constitution of the engine driven heat pump 100 according to the first embodiment will be described referring to FIG. 3.

FIG. 3 is a detailed diagram of an electric circuit in the engine driven heat pump 100 according to the first embodiment.

(Circuit Constitution Regarding Circuit Operation when System Power is Supplied)

The system cutoff relay 13 includes an A contact point (o illustrated in FIG. 3) at which the system cutoff relay 13 is conducted (closed) in an excited state where an exciting coil is excited and non-conducted (opened) in a non-excited state where the exciting coil is not excited and a B contact point (● illustrated in FIG. 3) at which the system cutoff relay 13 is non-conducted (opened) in the excited state and conducted (closed) in the non-excited state. Herein, the meaning of the A contact point or the B contact point is similarly applied to the independent power supply relay 14, the input power supply relay 15 (specifically, a control power supply relay 15a and an ignition power supply relay 15b), a battery relay 22 described later, a self-sustaining input relay 23, a starter relay 164, a control relay 24, a power restoration relay 16 of a second embodiment (see FIG. 14), a self-holding-type switch 105a, and a switch return relay 106 of a third embodiment (see FIG. 18).

The system cutoff relay 13 includes three A contact points (○) and two B contact points (●), and the independent power supply relay 14 includes four A contact points (○) and one B contact point (●). The input power supply relay 15 is constituted by the control power supply relay 15a and the ignition power supply relay 15b. The input power supply relay 15 (specifically, the control power supply relay 15a and the ignition power supply relay 15b) includes two A contact points (○) and two B contact points (●).

The engine driven heat pump 100 further includes a system input unit 103 connected to the system E, a starting transformer 17 that steps down the system voltage of the system E, a rectifier circuit 18 (specifically, a rectifier) that converts alternating current power from the starting transformer 17 into direct current power, a direct current stabilized power supply 19 that controls an alternating current voltage from the generator 130 into a constant direct current voltage, and an auxiliary inverter 20 that supplies power to auxiliary devices 21 such as an outdoor fan 211 (cooling fan) and a cooling water pump 212.

The system input unit 103 constitutes an external input terminal and inputs the system power from the system E.

The system input unit 103 is connected to the alternating current side of the power supply circuit 12, the input side of the starting transformer 17, the exciting coil of the input power supply relay 15 (specifically, the control power supply relay 15a and the ignition power supply relay 15b), and the input side of the battery charging circuit 162 via the three A contact points (○) of the system cutoff relay 13. Also, the system input unit 103 is connected to the exciting coil of the system cutoff relay 13 via one B contact point (●) of the independent power supply relay 14.

The output side of the starting transformer 17 is connected to the engine starter 140 via the rectifier circuit 18.

The power supply input port (specifically, a control power supply port and an ignition power supply port) of the control unit 11 is connected to the direct current side of the power supply circuit 12 via the two A contact points (○) of the input power supply relay 15 (specifically, the control power supply relay 15a and the ignition power supply relay 15b).

Also, the direct current side of the power supply circuit 12 and the direct current side of the direct current stabilized power supply 19 are connected to the auxiliary device 21 via the auxiliary inverter 20. The alternating current side of the direct current stabilized power supply 19 is connected to the generator 130.

Furthermore, the output side of the battery charging circuit 162 is connected to the engine actuation battery 161.

It is noted that, although not illustrated, an earth leakage breaker (ELB: Earth Leakage circuit Breaker) is connected between the system input unit 103, and the system cutoff relay 13 and the independent power supply relay 14. A starter relay whose operation is controlled by the control unit 11 is connected between the rectifier circuit 18 and the engine starter 140. A power-failure capacitor is connected in the middle of the line between the two A contact points (○) disposed between the control power supply relay 15a and the control power supply port of the control unit 11. A generator reactor is connected between the generator 130 and the input side of the direct current stabilized power supply 19.

(Circuit Constitution Regarding Circuit Operation when System Power is Cut Off)

The engine driven heat pump 100 further includes the battery relay 22, the self-sustaining input relay 23, and the control relay 24.

The battery relay 22 is configured to cut off the connection between the engine actuation battery 161 and the exciting coil of the self-sustaining input relay 23, whereas when the self-sustaining switch 102 is turned on by a user, the battery relay 22 is configured to supply the battery power from the engine actuation battery 161 to the exciting coil of the self-sustaining input relay 23.

The self-sustaining input relay 23 is configured to cut off the conduction of the self-sustaining instruction port of the control unit 11, whereas when the battery power from the engine actuation battery 161 is supplied to the exciting coil via the battery relay 22, the self-sustaining input relay 23 is configured to bring the self-sustaining instruction port of the control unit 11 into conduction. Herein, when the self-sustaining instruction port is conducted, and the control unit 11 receives a self-sustaining signal, the control unit 11 can recognize that the self-sustaining switch 102 is turned on by the user, and that the self-sustaining operation is instructed, whereby the control unit 11 can switch operational modes to a self-sustaining mode.

The control relay 24 is configured to cut off the connection between the engine actuation battery 161 and the exciting coil of the starter relay 164, whereas when engine starting power from the control unit 11 is supplied to the exciting coil, the control relay 24 is configured to supply battery power from the engine actuation battery 161 to the exciting coil of the starter relay 164.

The starter relay 164 is configured to cut off the connection between the engine actuation battery 161 and the engine starter 140, whereas when the battery power from the engine actuation battery 161 is supplied to the exciting coil via the control relay 24, the starter relay 164 is configured to supply the battery power from the engine actuation battery 161 to the engine starter 140.

Specifically, any of the battery relay 22, the self-sustaining input relay 23, the control relay 24, and the starter relay 164 includes one A contact point (○).

The exciting coil of the battery relay 22 is connected to the engine actuation battery 161 via the self-sustaining switch 102.

The exciting coil of the self-sustaining input relay 23 is connected to the engine actuation battery 161 via the A contact point (○) of the battery relay 22. The self-sustaining instruction port of the control unit 11 is connected via the A contact point (○) of the self-sustaining input relay 23 and one B contact point (●) of the system cutoff relay 13 and constitutes a closed circuit of the self-sustaining signal.

The exciting coil of the control relay 24 is connected to the engine starting output port of the control unit 11.

The exciting coil of the starter relay 164 is connected to the engine actuation battery 161 via the A contact point (○) of the control relay 24 and the A contact point (○) of the battery relay 22. The engine starter 140 is connected to the engine actuation battery 161 via the A contact point (○) of the starter relay 164.

The power supply input port (specifically, the control power supply port and the ignition power supply port) of the control unit 11 is connected to the engine actuation battery 161 via the two B contact points (●) of the input power supply relay 15 (specifically, the control power supply relay 15a and the ignition power supply relay 15b) and the A contact point (○) of the battery relay 22.

The signal input side of the inverter 163 is connected to the inverter output confirmation port of the control unit 11.

Furthermore, the direct current side of the direct current stabilized power supply 19 is connected to the input side (direct current side) of the inverter 163.

Herein, although not illustrated, a fuse is connected between the A contact point (○) of the starter relay 164 and the exciting coil of the battery relay 22, and between the B contact point (●) of the input power supply relay 15 (specifically, the control power supply relay 15a and the ignition power supply relay 15b) and the A contact point (○) of the battery relay 22. The fuse and a battery switch are connected in series between the self-sustaining switch 102 and the exciting coil of the battery relay 22. The fuse and an independent actuation display lamp, which are disposed in parallel to the self-sustaining input relay 23, are connected in series between the terminals of the exciting coil of the self-sustaining input relay 23.

As described later, it is noted that other circuit constitution with regard to the circuit constitution regarding circuit operations at the time of power failure has been described. Accordingly, its description is omitted.

(Circuit Constitution Regarding Circuit Operation in Self-Sustaining Operation)

When the output power from the inverter 163 is received after the establishment of the voltage of the generator 130, the engine driven heat pump 100 is configured to supply the output power from the inverter 163 to the power supply circuit 12 and the battery charging circuit 162 by means of the independent power supply relay 14 and supply the output power from the inverter 163 to the outside of the engine driven heat pump 100 via the independent output unit 101.

Also, while the output power from the inverter 163 is being supplied, the engine driven heat pump 100 is configured to maintain the cutoff of the connection between the system E, and the power supply circuit 12 and the battery charging circuit 162 by means of the system cutoff relay 13 and maintain the output power from the inverter 163 until the self-sustaining signal is interrupted.

Also, when the power is restored, and the output power from the inverter 163 is interrupted, the engine driven heat pump 100 is configured to restore the connection between the system E, and the power supply circuit 12 and the battery charging circuit 162 by means of the system cutoff relay 13.

In the present embodiment, when the output power from the inverter 163 is interrupted, the engine driven heat pump 100 is configured to cut off the connection between the inverter 163, and the power supply circuit 12 and the battery charging circuit 162 by means of the independent power supply relay 14.

More particularly, the independent output unit 101 is connected in parallel to the independent power supply relay 14 with respect to the inverter 163 and constitutes external output terminals. The independent output unit 101 is connected to the switching unit 410 illustrated in FIG. 1 and configured to supply the output power from the inverter 163 to the switching unit 410.

When the output power from the inverter 163 is supplied to the exciting coil, the independent power supply relay 14 is configured to supply the output power from the inverter 163 to the power supply circuit 12 and the battery charging circuit 162, and the inverter output confirmation port of the control unit 11 is conducted. Herein, when the inverter output confirmation port is conducted, and the inverter output signal is received, the control unit 11 can recognize that the output power from the inverter 163 is outputted.

Specifically, the output side (alternating current side) of the inverter 163 is connected to the alternating current side of the power supply circuit 12, the input side of the starting transformer 17, the exciting coil of the input power supply relay 15 (specifically, the control power supply relay 15*a* and the ignition power supply relay 15*b*), and the input side of the battery charging circuit 162 via three A contact points (○) of the independent power supply relay 14. Also, the output side of the inverter 163 is connected to the independent output unit 101. Furthermore, the output side of the inverter 163 is connected to the exciting coil of the independent power supply relay 14 via one B contact point (●) of the system cutoff relay 13. Herein, as described above, the system input unit 103 is connected to the exciting coil of the system cutoff relay 13 via the B contact point (●) of the independent power supply relay 14, and the output side of the inverter 163 is connected to the exciting coil of the independent power supply relay 14 via the B contact point (●) of the system cutoff relay 13. Accordingly, a circuit constituted between the system cutoff relay 13 and the independent power supply relay 14, which are connected in an above-mentioned manner, constitutes a circuit (so-called an interlock circuit) in which, with respect to the system cutoff relay 13 and the independent power supply relay 14, priority is placed on a one-side relay that operates first (excitation), and the operation (excitation) of the other-side relay is prohibited.

Also, the inverter output confirmation port of the control unit 11 is connected via one A contact point (○) of the independent power supply relay 14, thereby constituting the closed circuit of the inverter output signal.

Herein, although not illustrated, a cross current prevention transformer is connected between the independent power supply relay 14 and a branch portion on the independent power supply relay 14 side of the output side of the inverter 163, and a circuit protector (CP: Circuit Protector) is provided between the independent output unit 101 and a branch portion on the independent output unit 101 side of the output side of the inverter 163.

As described later, it is noted that other circuit constitution with regard to the circuit constitution regarding circuit operations at the time of the self-sustaining operation has been described. Accordingly, its description is omitted.

<Regarding Specific Circuit Operations>

Next, the specific circuit operations of the engine driven heat pump 100 according to the first embodiment are divided into a circuit operation during the supply of system power, a circuit operation during power failure, and a circuit operation during the self-sustaining operation and described referring to FIGS. 4 to 13.

FIG. 4 is a timing chart illustrating the specific circuit operation of the engine driven heat pump 100 according to the first embodiment.

(Circuit Operations of Engine Driven Heat Pump During Supply of System Power)

At first, the circuit operation of the engine driven heat pump 100 during the supply of system power will be described referring to FIGS. 4, and 5 to 7. It is noted that the self-sustaining switch 102 is in an OFF state in the circuit operation.

Regarding the circuit constitution of the engine driven heat pump 100 illustrated in FIG. 3, FIGS. 5, 6, and 7 are circuit diagrams in which the wiring of the circuit constitution associated with the circuit operations at a first process, a second process, and a third process during the supply of system power is represented in a thick line.

Figure 5:
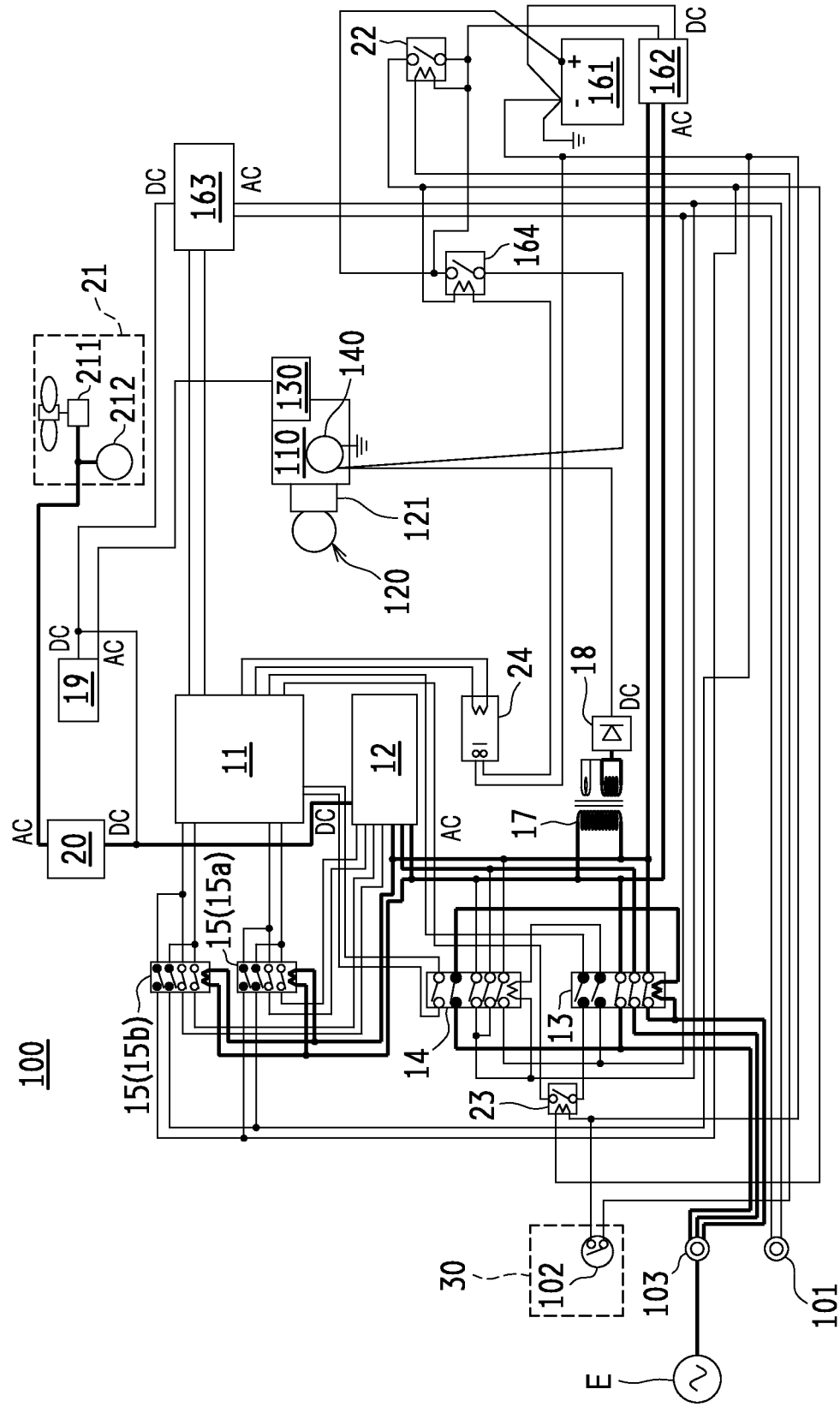
FIG. 5 is a circuit diagram in which the wiring of the circuit constitution associated with the circuit operations at a first process during the supply of system power is represented in a thick line, with respect to circuit constitution of the engine driven heat pump illustrated in FIG. 3.

As illustrated in the first process during the supply of system power in FIG. 5, regarding the engine driven heat pump 100, when the system power is supplied from the system E, the system power from the system E is supplied to the exciting coil of the system cutoff relay 13 via the B contact point (●) in the conductive state (see Step S1 in FIG. 4) with respect to the independent power supply relay 14, and the A contact point (○) of the system cutoff relay 13 (see Step S1 in FIG. 4) is conducted, whereas the B contact point (●) of the system cutoff relay 13 (see Step S1 in FIG. 4) falls into a non-conductive state. Then, in the engine driven heat pump 100, the system power from the system E is supplied to the alternating current side of the power supply circuit 12, the input side of the starting transformer 17, the exciting coil of the input power supply relay 15 (specifically, a control power supply relay 15*a* and an ignition power supply relay 15*b*), and the input side of the battery charging circuit 162 via the A contact point (○), which is in the conductive state with respect to the system cutoff relay 13, and the A contact point (○) of the input power supply relay 15 (specifically, the control power supply relay 15*a* and the ignition power supply relay 15*b*) (see Step S1 in FIG. 4) is conducted, whereas the B contact point (●) of the input power supply relay 15 (see Step S1 in FIG. 4) falls into the non-conductive state.

Figure 6:
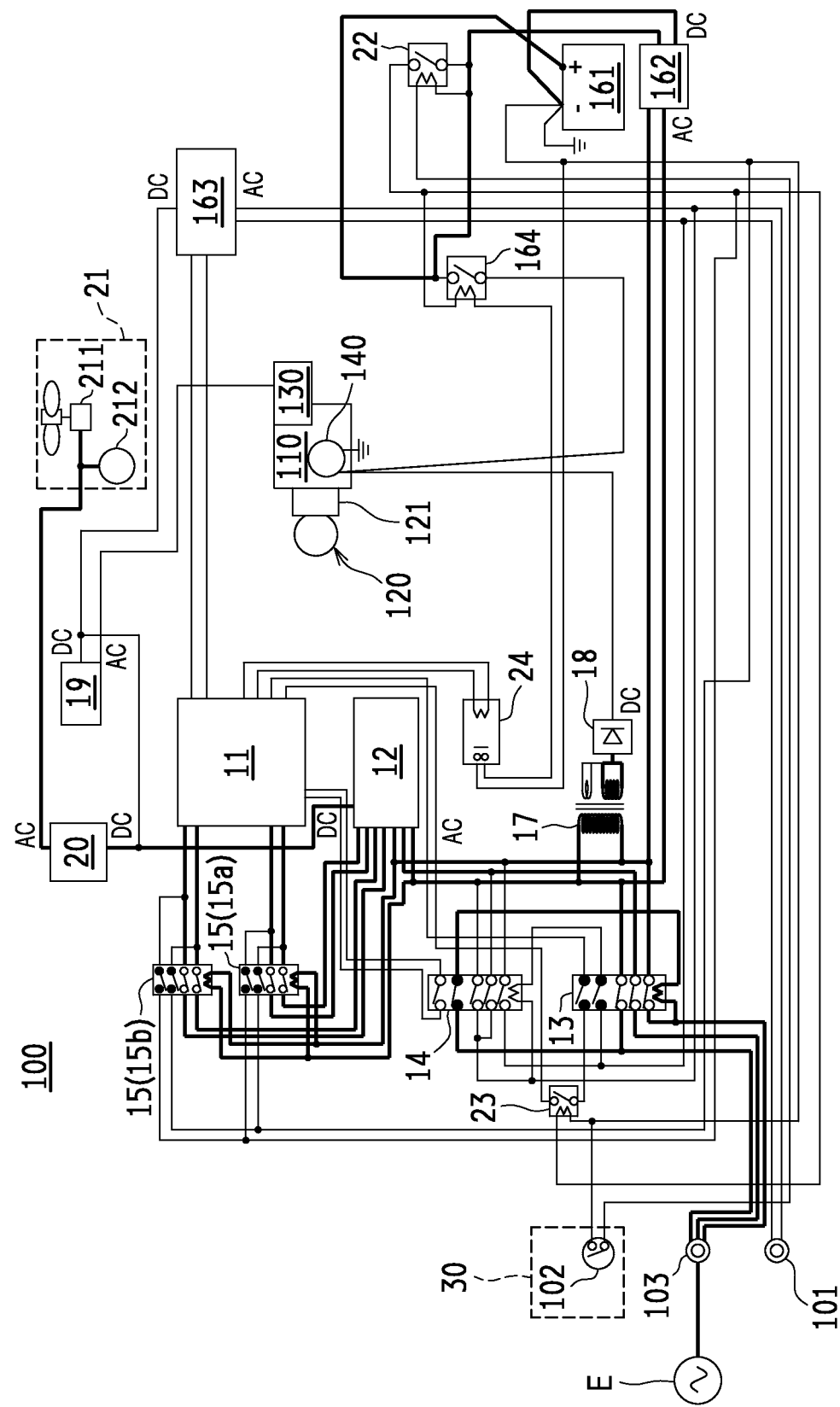
FIG. 6 is a circuit diagram in which the wiring of the circuit constitution associated with the circuit operations at a second process during the supply of system power is represented in a thick line, with respect to the circuit constitution of the engine driven heat pump illustrated in FIG. 3.

Accordingly, as illustrated in the second process during the supply of system power in FIG. 6, the engine driven heat pump 100 can supply the system power from the system E to the power supply input port (specifically, the control power supply port and the ignition power supply port) of the control unit 11 via the A contact points (○) in the conductive state with respect to the power supply circuit 12 and the input power supply relay 15 (specifically, the control power supply relay 15*a* and the ignition power supply relay 15*b*). Also, the engine driven heat pump 100 can supply the system power from the system E to the rectifier circuit 18 via the starting transformer 17 and supply the system power from the system E to the engine actuation battery 161 via the battery charging circuit 162.

Figure 7:
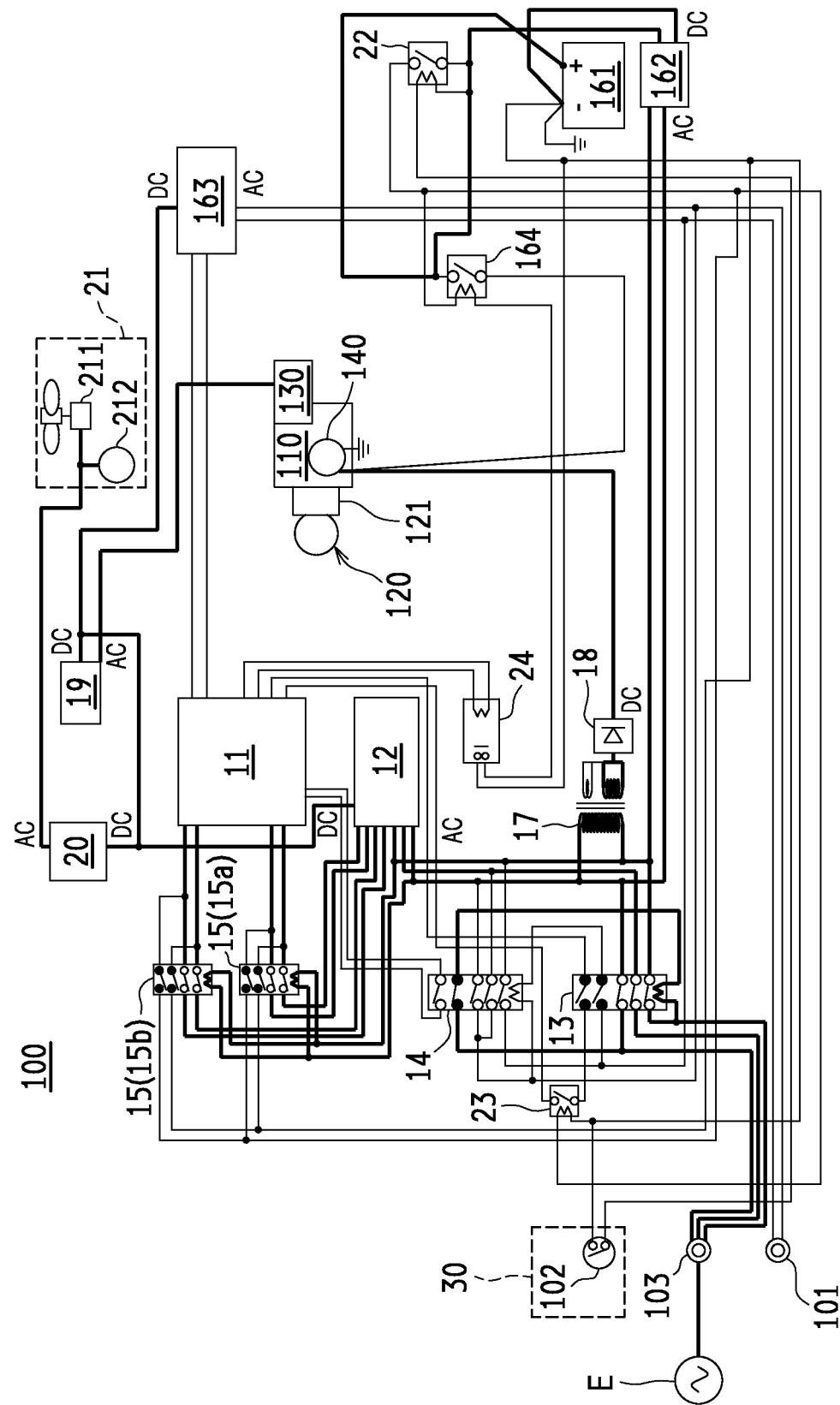
FIG. 7 is a circuit diagram in which the wiring of the circuit constitution associated with the circuit operations at a third process during the supply of system power is represented in a thick line, with respect to the circuit constitution of the engine driven heat pump illustrated in FIG. 3.

At this time, the operational mode of the control unit 11 is an ordinary operational mode, and when a user's request (a user's instruction) for a heat pump operation (air conditioning in the example) is provided, as illustrated in the third process during the supply of system power in FIG. 7, the output power from the rectifier circuit 18 is supplied to the engine starter 140 for a predetermined period of time via a starter relay not illustrated, thereby starting the engine 110 and the generator 130, and the electromagnetic clutch 121 is closed, and the compressor 120 is operated.

Also, in the engine driven heat pump 100, the output power from the generator 130 is supplied to the input side of the inverter 163 via the direct current stabilized power supply 19, and the output power from the generator 130 is supplied to the auxiliary device 21 via the direct current stabilized power supply 19 and the auxiliary inverter 20. At this time, both the power supply circuit 12 and the direct current stabilized power supply 19 are operated, and the output power from both the power supply circuit 12 and the direct current stabilized power supply 19 is supplied to the auxiliary inverter 20. In this example, the output voltage of the direct current stabilized power supply 19 is higher than the output voltage of the power supply circuit 12, so that the output power of the direct current stabilized power supply 19 is supplied to the auxiliary inverter 20. This is similarly applied to during the self-sustaining operation described later.

Then, during the supply of system power, the control unit 11 does not transmit an output instruction signal, indicating the output of the inverter 163 from the inverter output confirmation port (which allows the inverter 163 to be operated), to the signal input side of the inverter 163, thereby preventing the operation of the inverter 163.

(Circuit Operations of Engine Driven Heat Pump During Power Failure)

Next, the circuit operation of the engine driven heat pump 100 during power failure will be described referring to FIGS. 3, 4, and 8 to 10.

Figure 8:
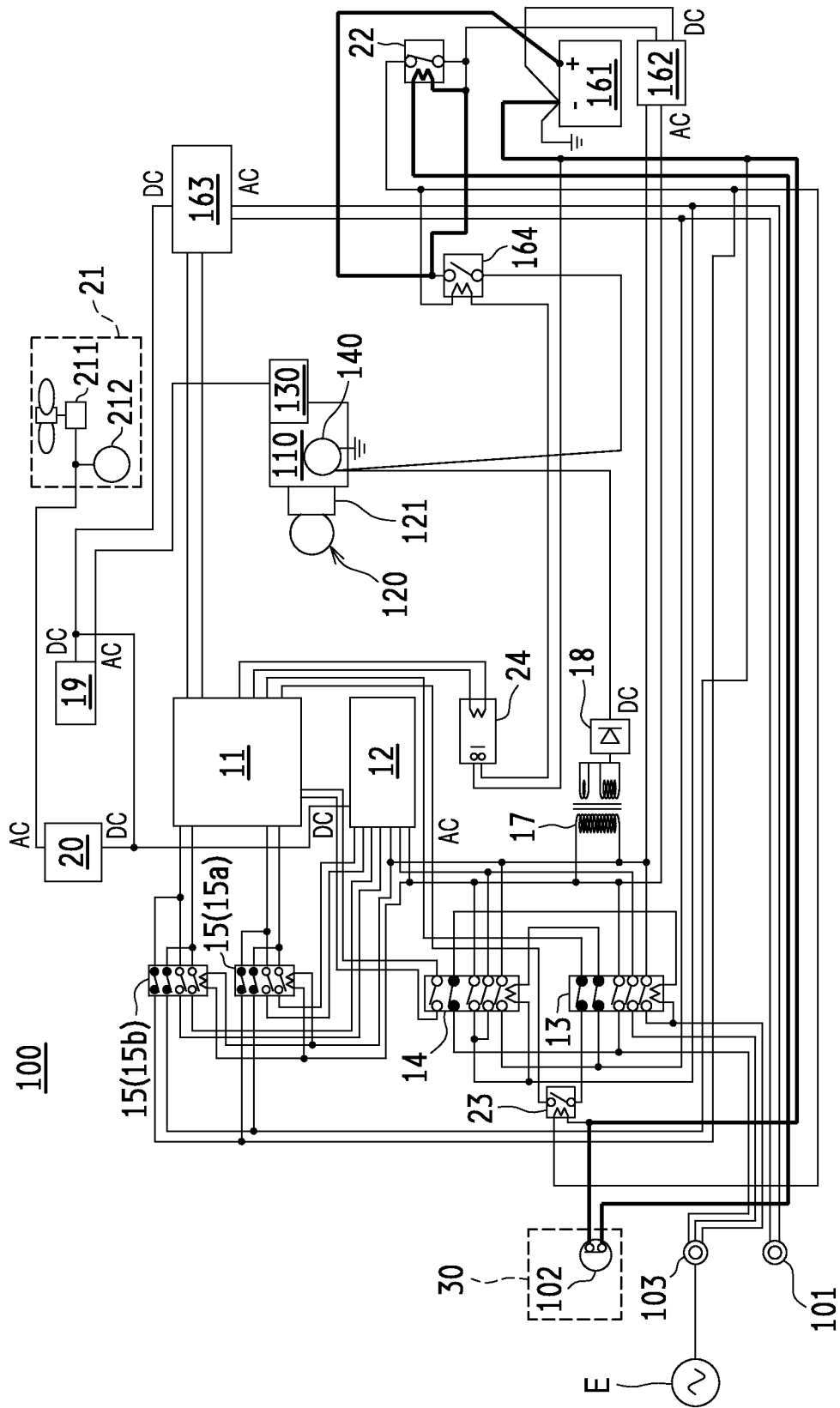
FIG. 8 is a circuit diagram in which the wiring of the circuit constitution associated with the circuit operations at a first process during power failure is represented in a thick line, with respect to circuit constitution of the engine driven heat pump illustrated in FIG. 3.
Figure 9:
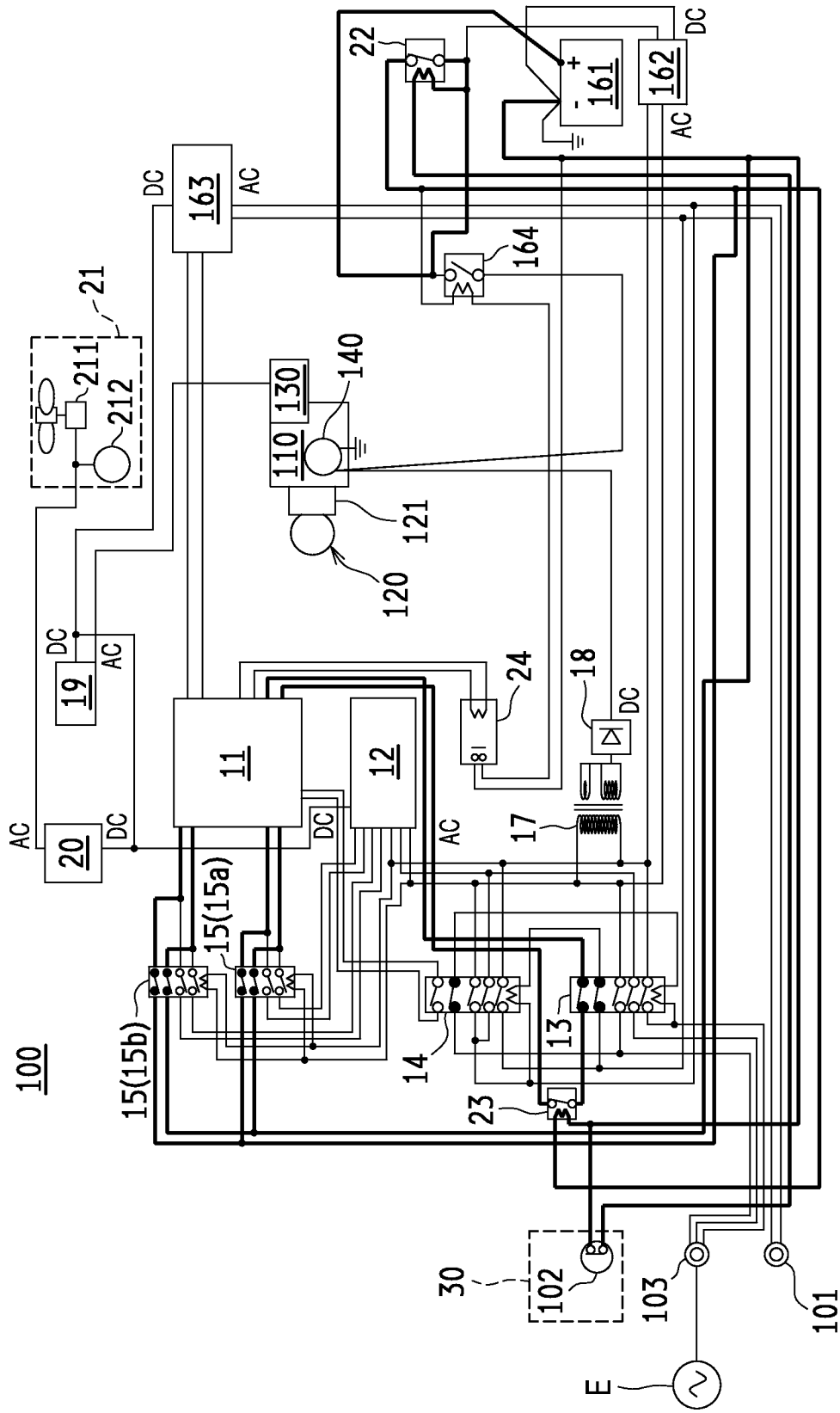
FIG. 9 is a circuit diagram in which the wiring of the circuit constitution associated with the circuit operations at a second process during the power failure is represented in a thick line, with respect to the circuit constitution of the engine driven heat pump illustrated in FIG. 3.
Figure 10:
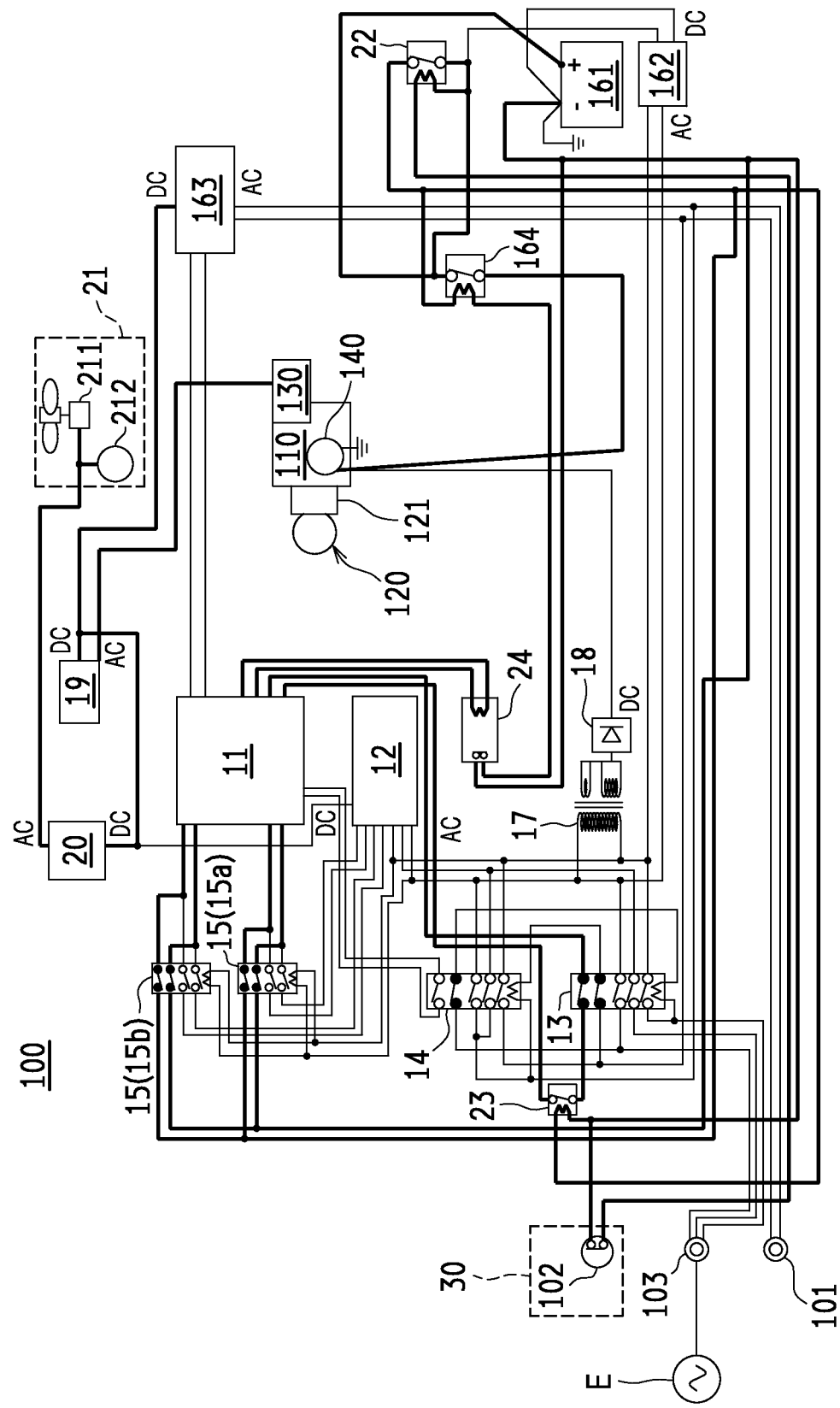
FIG. 10 is a circuit diagram in which the wiring of the circuit constitution associated with the circuit operations at a third process during the power failure is represented in a thick line, with respect to the circuit constitution of the engine driven heat pump illustrated in FIG. 3.

FIGS. 8, 9, and 10 are circuit diagrams in which the wiring of the circuit constitution associated with the circuit operations at a first process, a second process, and a third process during power failure is represented in a thick line, with respect to the circuit constitution of the engine driven heat pump 100 illustrated in FIG. 3.

Regarding the engine driven heat pump 100 as illustrated in FIG. 3, when the power of the system E is cut off, the engine 110 is stopped (see Step S2 in FIG. 4). Thus, when the self-sustaining switch 102 is turned on by the user from a state where the power of the system E is cut off (see Step S3 in FIG. 4), as illustrated in the first process during power failure in FIG. 8, the battery power from the engine actuation battery 161 is supplied to the exciting coil of the battery relay 22, and the A contact point (○) of the battery relay 22 is conducted (see Step S3 in FIG. 4). Subsequently, regarding the engine driven heat pump 100, as illustrated in the second process during power failure in FIG. 9, the battery power from the engine actuation battery 161 is supplied to the power supply input port (specifically, the control power supply port and the ignition power supply port) of the control unit 11 via the A contact point (○), which is in a conductive state with respect to the battery relay 22, and the B contact point (●) (see Step S3 in FIG. 4), which is in a conductive state with respect to the input power supply relay 15 (specifically, the control power supply relay 15a and the ignition power supply relay 15b), and furthermore supplied to the exciting coil of the self-sustaining input relay 23 via the A contact point (○), which is in a conductive state with respect to the battery relay 22, and the A contact point (○) of the self-sustaining input relay 23 is conducted.

Accordingly, the battery power from the engine actuation battery 161 is supplied to the control unit 11, and the self-sustaining instruction port of the control unit 11 is conducted via the A contact point (○), which is in a conductive state with respect to the self-sustaining input relay 23, so that the control unit 11 can receive the self-sustaining signal. Consequently, the control unit 11 enters the operational state and further can recognize that the self-sustaining switch 102 is turned on by the user and the self-sustaining operation is instructed.

Then, when the control unit 11 recognizes that the self-sustaining operation is instructed by the user, the control unit 11 switches the operational mode to the self-sustaining mode, the engine starting power is supplied from the engine starting output port to the exciting coil of the control relay 24 for a predetermined period of time, as illustrated in the third process during power failure in FIG. 10, irrespective of the user's request for the heat pump operation (air conditioning in the example) (specifically, the transmission for a predetermined period of time (e.g., five seconds) is repeated at predetermined times at predetermined intervals (e.g., for every three second)), and the battery power from the engine actuation battery 161 is supplied to the exciting coil of the starter relay 164 via the A contact point (○) of the control relay 24. Accordingly, the A contact point (○) (see Step S4 in FIG. 4) of the starter relay 164 is conducted for a predetermined period of time, and the battery power from the engine actuation battery 161 is supplied to the engine starter 140 via the A contact point (○) of the starter relay 164, thereby starting the engine 110 and starting the generator 130.

Also, regarding the engine driven heat pump 100, the output power from the generator 130 is supplied to the input side of the inverter 163 via the direct current stabilized power supply 19, and the output power from the generator 130 is supplied to the auxiliary device 21 via the direct current stabilized power supply 19 and the auxiliary inverter 20.

(Circuit Operations of Engine Driven Heat Pump During Self-Sustaining Operation)

Next, the circuit operation of the engine driven heat pump 100 during the self-sustaining operation will be described referring to FIGS. 4, and 11 to 13.

Figure 11:
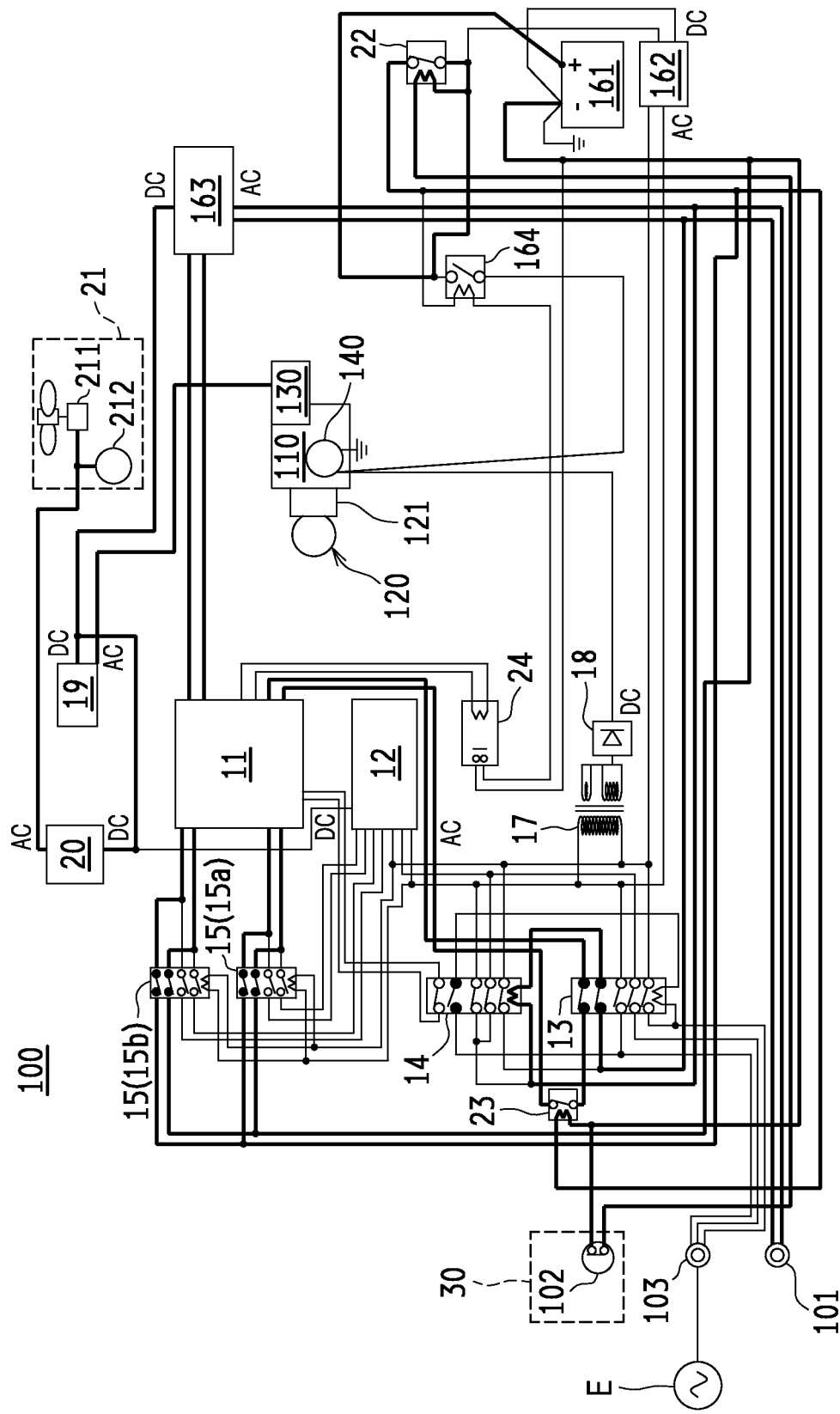
FIG. 11 is a circuit diagram in which the wiring of the circuit constitution associated with the circuit operations at a first process during a self-sustaining operation is represented in a thick line, with respect to circuit constitution of the engine driven heat pump illustrated in FIG. 3.
Figure 12:
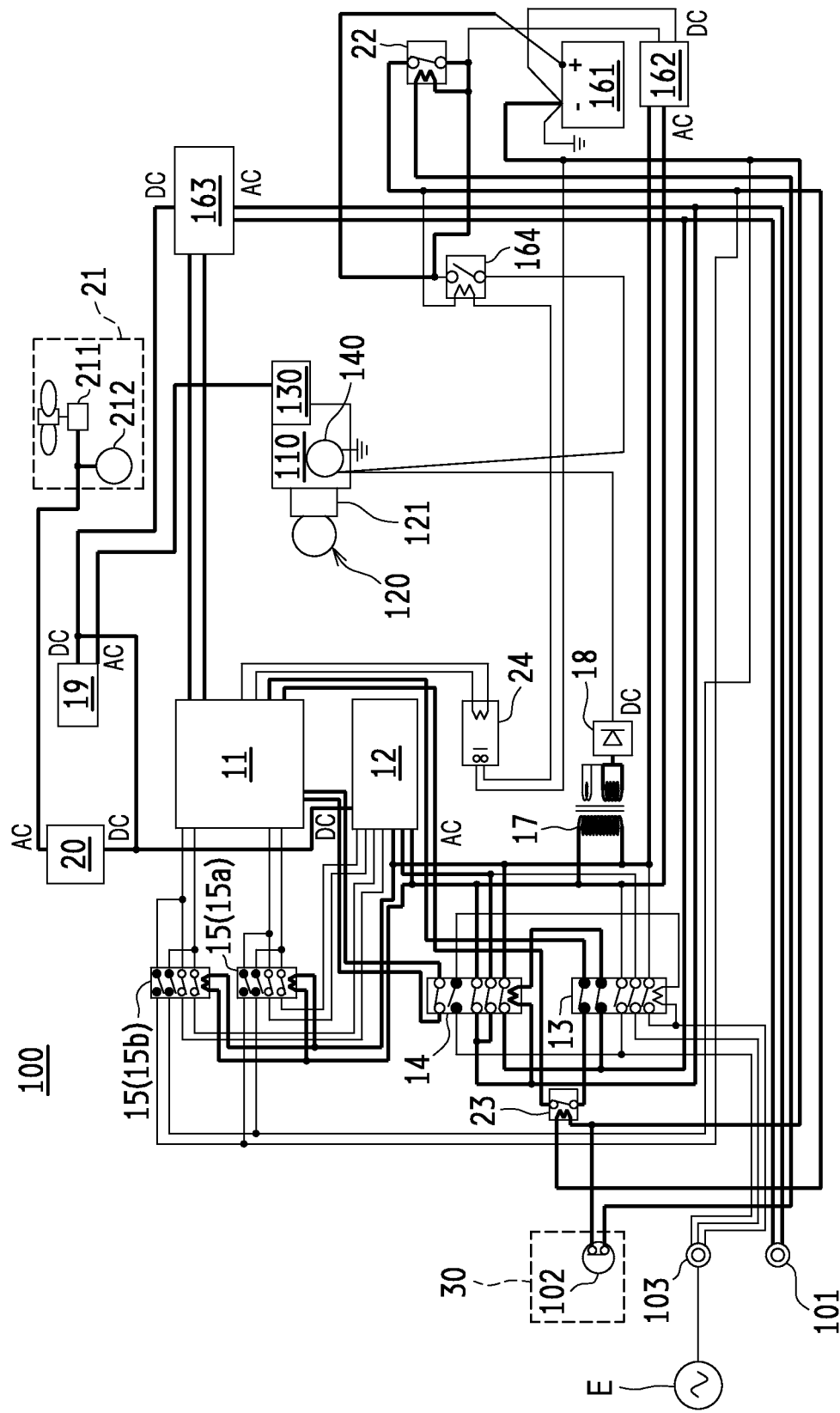
FIG. 12 is a circuit diagram in which the wiring of the circuit constitution associated with the circuit operations at a second process during the self-sustaining operation is represented in a thick line, with respect to the circuit constitution of the engine driven heat pump illustrated in FIG. 3.
Figure 13:
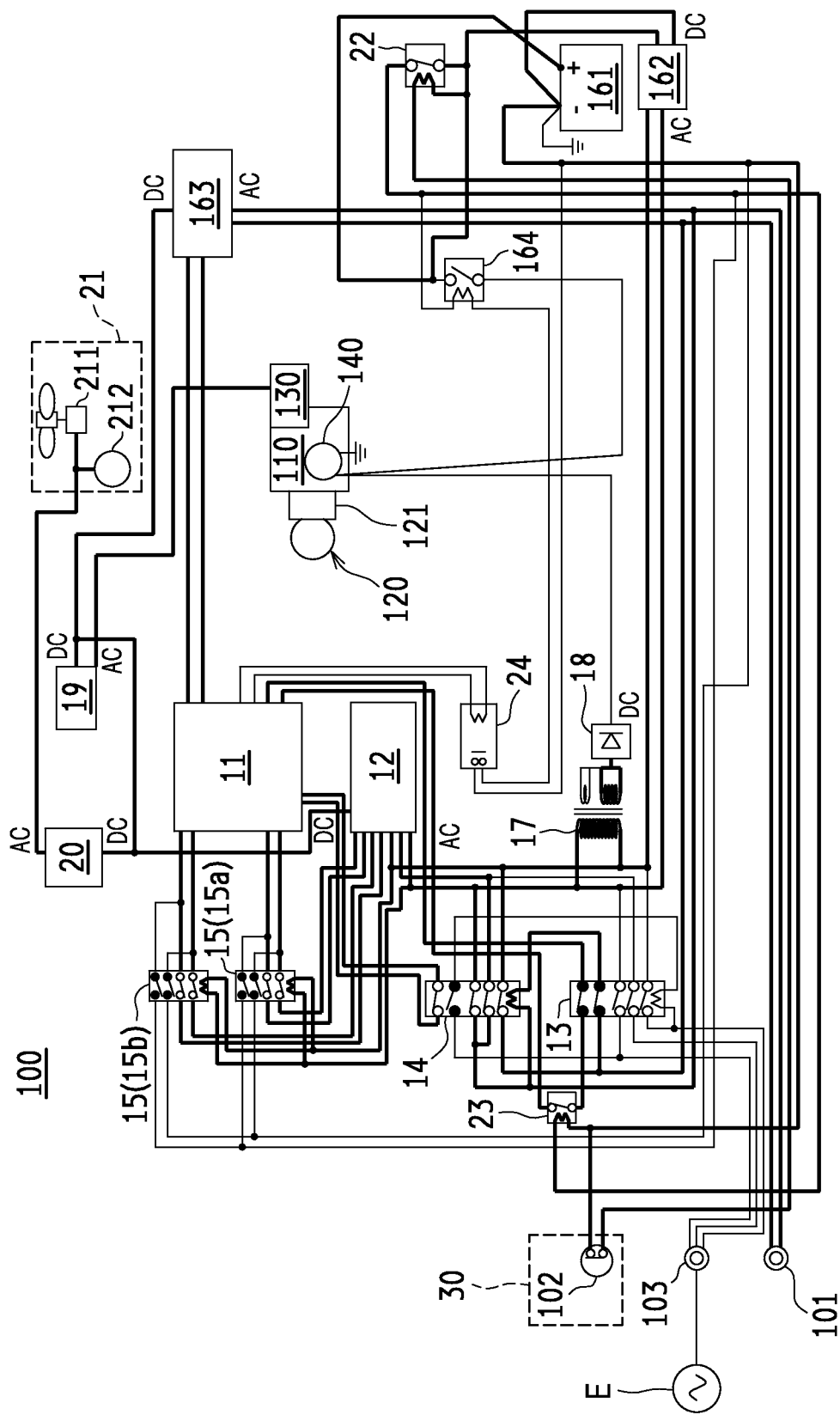
FIG. 13 is a circuit diagram in which the wiring of the circuit constitution associated with the circuit operations at a third process during the self-sustaining operation is represented in a thick line, with respect to the circuit constitution of the engine driven heat pump illustrated in FIG. 3.

FIGS. 11, 12, and 13 are circuit diagrams in which the wiring of the circuit constitution associated with the circuit operations at a first process, a second process, and a third process during the self-sustaining operation is represented in a thick line, with respect to the circuit constitution of the engine driven heat pump 100 illustrated in FIG. 3.

Regarding the engine driven heat pump 100, as illustrated in the first process during the self-sustaining operation in FIG. 11, in a state of the circuit operation at which the generator 130 of the engine driven heat pump 100 at the third process during the power failure illustrated in FIG. 10 is actuated, when the control unit 11 transmits the output instruction signal from the inverter output confirmation port to the signal input side of the inverter 163 after the establishment of the voltage of the generator 130 (when the voltage reaches a predetermined voltage or higher, or after a predetermined period of time has passed), and the inverter 163 is actuated (see the supply of alternating current power at Step S5 in FIG. 4), and the output power from the inverter 163 is supplied to the exciting coil of the independent power supply relay 14 via the B contact point (●) (see Step S5 in FIG. 4), which is in a conductive state with respect to the system cutoff relay 13, and the A contact point (○) (see Step S5 in FIG. 4) of the independent power supply relay 14 is conducted, while the B contact point (●) (see Step S5 in FIG. 4) of the independent power supply relay 14 is non-conducted. Accordingly, regarding the engine driven heat pump 100, as illustrated in the second process during the self-sustaining operation in FIG. 12, the output power from the inverter 163 is supplied to the alternating current side of the power supply circuit 12, the input side of the starting transformer 17, the exciting coil of the input power supply relay 15 (specifically, the control power supply relay 15a and the ignition power supply relay 15b), and the input side of the battery charging circuit 162 via the A contact point (○), which is in a conductive state with respect to the independent power supply relay 14, and the A contact point (○) (see Step S5 in FIG. 4) of the input power supply relay 15 (specifically, the control power supply relay 15a and the ignition power supply relay 15b) is conducted, whereas the B contact point (●) (see Step S5 in FIG. 4) of the input power supply relay 15 is non-conducted.

Accordingly, in place of the battery power from the engine actuation battery 161, as illustrated in the third process during the self-sustaining operation in FIG. 13, the engine driven heat pump 100 can supply the output power from the inverter 163 to the power supply input port of the control unit 11 (specifically, the control power supply port and the ignition power supply port) via the A contact points (○), which are in a conductive state with respect to the power supply circuit 12 and the input power supply relay 15 (specifically, the control power supply relay 15a and the ignition power supply relay 15b). Herein, with respect to a switching process from the first process in FIG. 11 to the third process in FIG. 13 (for example, see the second process in FIG. 12), although an instantaneous interruption of the supply of power to the control unit 11 occurs, the supply of power to the control unit 11 can be maintained by a power-failure capacitor (not illustrated) connected in the middle of the wire between the two A contact points (○) of the control power supply relay 15a and the control power supply port of the control unit 11. Also, the engine driven heat pump 100 can supply the output power from the inverter 163 to the rectifier circuit 18 via the starting transformer 17 and supply the output power from the inverter 163 to the engine actuation battery 161 via the battery charging circuit 162. Furthermore, the engine driven heat pump 100 can supply the output power from the inverter 163 to the outside of the engine driven heat pump 100 via the independent output unit 101 (in the example, the switching unit 410 of the self-sustaining switching device 400 (see FIG. 1)).

At this time, regarding the engine driven heat pump 100, even when the system E is recovered from the power failure, and the power is restored, the B contact point (●) (see Step S5 in FIG. 4) of the independent power supply relay 14 is in the non-conductive state, and the power is not supplied to the exciting coil of the system cutoff relay 13. Accordingly, with respect to an interlock circuit constituted between the system cutoff relay 13 and the independent power supply relay 14, the A contact points (○) (see Step S5 in FIG. 4) of the system cutoff relay 13 is in the non-conductive state, and the B contact point (●) (see Step S5 in FIG. 4) of the system cutoff relay 13 is in the conductive state, and the A contact points (○) of the independent power supply relay 14 is in the conductive state, and the B contact point (●) of the independent power supply relay 14 is in the non-conductive state. Consequently, in the engine driven heat pump 100, the cutoff of the connection between the system E, and the power supply circuit 12 and the battery charging circuit 162 is maintained by means of the system cutoff relay 13 during the supply of the output power from the inverter 163, and the output power from the inverter 163 is maintained until the self-sustaining switch 102 is turned off by the user, and the self-sustaining signal is interrupted.

According to the engine driven heat pump 100 of the first embodiment, as described above, the user manually operates the self-sustaining switch 102 during the power failure, so that power can be obtained from the engine driven heat pump 100. Then, even when the supply of power is resumed after the power failure, and the power is restored, the self-sustaining operation can be continued for an arbitrary period of time.

(Circuit Operations of Engine Driven Heat Pump when Self-Sustaining Operation is Stopped)

Herein, regarding the engine driven heat pump 100, when the self-sustaining switch 102 is turned off by the user during the self-sustaining operation, the supply of the battery power from the engine actuation battery 161 to the exciting coil of the battery relay 22 is cut off, and the A contact point (○) of the battery relay 22 is in the non-conductive state. Furthermore, the supply of the battery power from the engine actuation battery 161 to the exciting coil of the self-sustaining input relay 23 is cut off, and the A contact point (○) of the self-sustaining input relay 23 is in the non-conductive state.

Accordingly, the self-sustaining instruction port is cut off by the A contact point (○), which is in a non-conductive state with respect to the self-sustaining input relay 23, and the control unit 11 does not receive the self-sustaining signal, so that the control unit 11 can recognize that the self-sustaining switch 102 is turned off by the user, and that the stoppage of the self-sustaining operation is indicated.

Then, when the control unit 11 recognizes that the self-sustaining operation is not indicated by the user, the control unit 11 switches the operational mode to the ordinary operational mode, stops the transmission of the output instruction signal from the inverter output confirmation port to the signal input side of the inverter 163, and stops the operation of the inverter 163, and further thereby stopping the engine 110.

At this time, when the power of the system E is cut off, the engine driven heat pump 100 is in a non-operation state illustrated in FIG. 3.

(Circuit Operations of Engine Driven Heat Pump when Power is Restored)

Also, when the power of the system E is restored, regarding the engine driven heat pump 100, as illustrated in the first process during the supply of system power in FIG. 5, the A contact point (○) (see Step S1 in FIG. 4) of the independent power supply relay 14 is in the non-conductive state, and the B contact point (●) (see Step S1 in FIG. 4) of the independent power supply relay 14 is in the conductive state, and the system power from the system E is supplied to the exciting coil of the system cutoff relay 13 via the B contact point (●) which is in the conductive state with respect to the independent power supply relay 14, and the A contact point (○) (see Step S1 in FIG. 4) of the system cutoff relay 13 is in the conductive state, while the B contact point (●) (see Step S1 in FIG. 4) of the system cutoff relay 13 is in the non-conductive state. Subsequently, regarding the engine driven heat pump 100, the system power from the system E is supplied to the alternating current side of the power supply circuit 12, the input side of the starting transformer 17, the exciting coil of the input power supply relay 15 (specifically, the control power supply relay 15a and the ignition power supply relay 15b), and the input side of the battery charging circuit 162 via the A contact point (○), which is in the conductive state with respect to the system cutoff relay 13, and the A contact point (○) (see Step S1 in FIG. 4) of the input power supply relay 15 (specifically, the control power supply relay 15a and the ignition power supply relay 15b) is conducted, whereas the B contact point (●) (see Step S1 in FIG. 4) of the input power supply relay 15 is non-conducted. Accordingly, the connection between the system E, and the power supply circuit 12 and the battery charging circuit 162 is recovered by means of the system cutoff relay 13, and as a result, through the second process during the supply of the system power in FIG. 6, the circuit operation of the engine driven heat pump 100 is performed as the circuit operation represented by the third process during the supply of the system power in FIG. 7.

Second Embodiment

Herein, as described in the first embodiment, as long as the user does not perform a manual operation (an OFF operation of the self-sustaining switch 102 in the example) during the power restoration, the user's needs for continuing the supply of the output power from the inverter 163 (that is, self-sustaining operation) are anticipated. On the other hand, when the supply of the output power from the inverter 163 (that is, self-sustaining operation) is continued during the power restoration, fuel consumption in the self-sustaining operation (gas consumption in the example) is increased, so that when the power of the system E is restored, the user's needs for automatically stopping the supply of the output power from the inverter 163 (that is, self-sustaining operation) and for supplying the system power from the system E are anticipated.

Accordingly, in view of the engine driven heat pump 100 according to the first embodiment, the engine driven heat pump 100 according to a second embodiment is configured to turn off the output instruction signal from the control unit 11 to the inverter 163 when the power of the system E is restored. When the output power from the inverter 163 is interrupted, the engine driven heat pump 100 is configured to cut off the connection between the inverter 163, and the power supply circuit 12 and the battery charging circuit 162 by means of the independent power supply relay 14.

Figure 14:
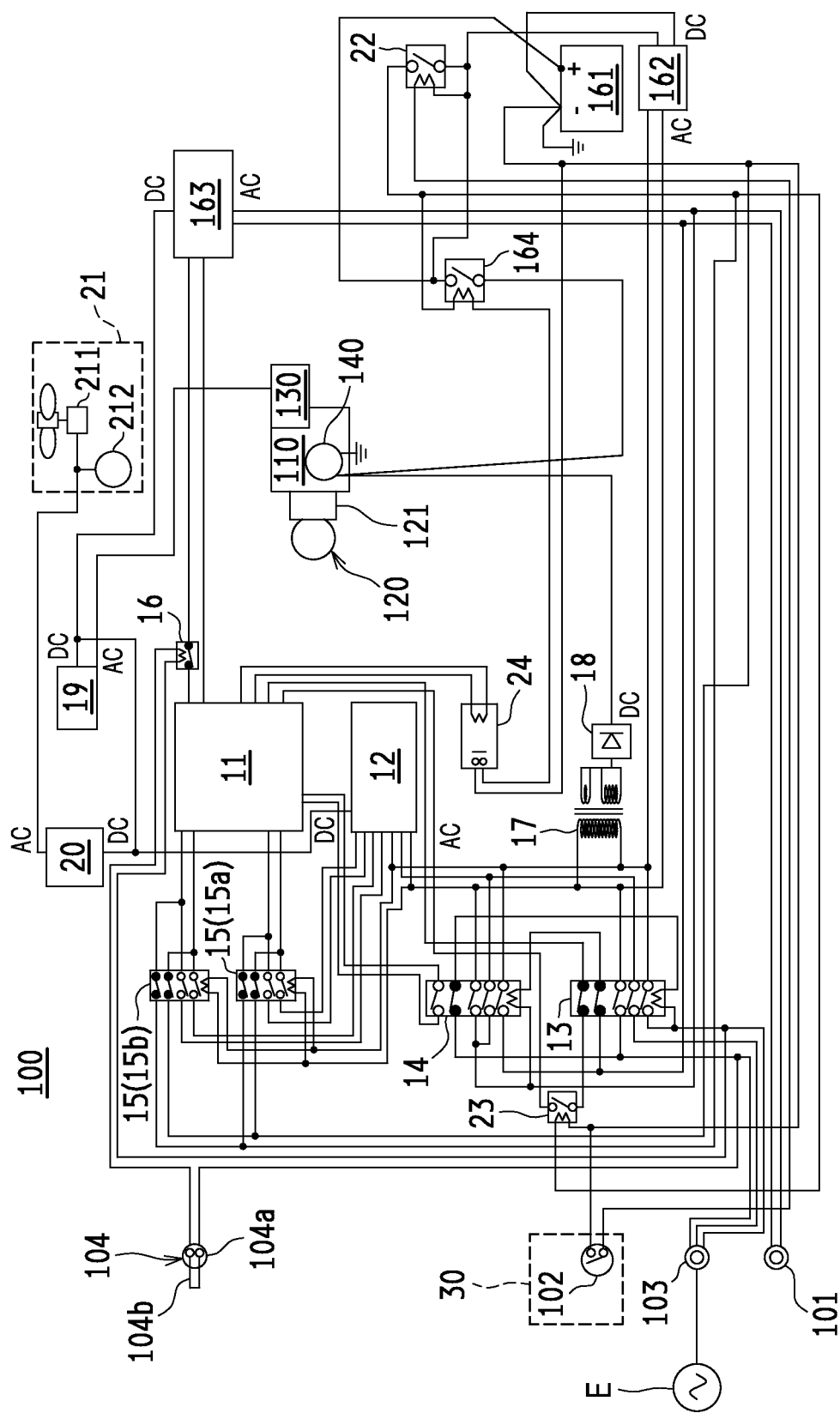
FIG. 14 is a detailed diagram of the electric circuit of the engine driven heat pump according to a second embodiment.

FIG. 14 is a detailed diagram of the electric circuit of the engine driven heat pump 100 according to the second embodiment.

In the engine driven heat pump 100 according to the second embodiment, illustrated in FIG. 14, the power restoration relay 16 and a power restoration automatic stop conductive member 104 are provided, in addition to the components of the engine driven heat pump 100 according to the first embodiment.

With respect to the engine driven heat pump 100 according to the second embodiment, the same numbers of the engine driven heat pump 100 according to the first embodiment are designated as the same references, and thereby duplicated descriptions are omitted.

The power restoration relay 16 is configured to be connected to the inverter output confirmation port of the control unit 11 and the signal input side of the inverter 163, whereas the power restoration relay 16 is configured to cut off the connection between the inverter output confirmation port of the control unit 11 and the signal input side of the inverter 163 during the supply of the system power from the system E. Accordingly, the output instruction signal from the control unit 11 to the inverter 163 can be supplied, whereas the supply of the output instruction signal from the control unit 11 to the inverter 163 can be stopped during the supply of the system power from the system E.

When the system power from the system E is supplied to the exciting coil via the power restoration automatic stop conductive member 104, the power restoration relay 16 is configured to cut off the conduction between the inverter output confirmation port of the control unit 11 and the signal input side of the inverter 163.

Specifically, the power restoration relay 16 includes one B contact point (●). The inverter output confirmation port of the control unit 11 is connected to the signal input side of the inverter 163 via the B contact point (●) of the power restoration relay 16. The exciting coil of the power restoration relay 16 is connected to the system E via the power restoration automatic stop conductive member 104.

Figure 15:
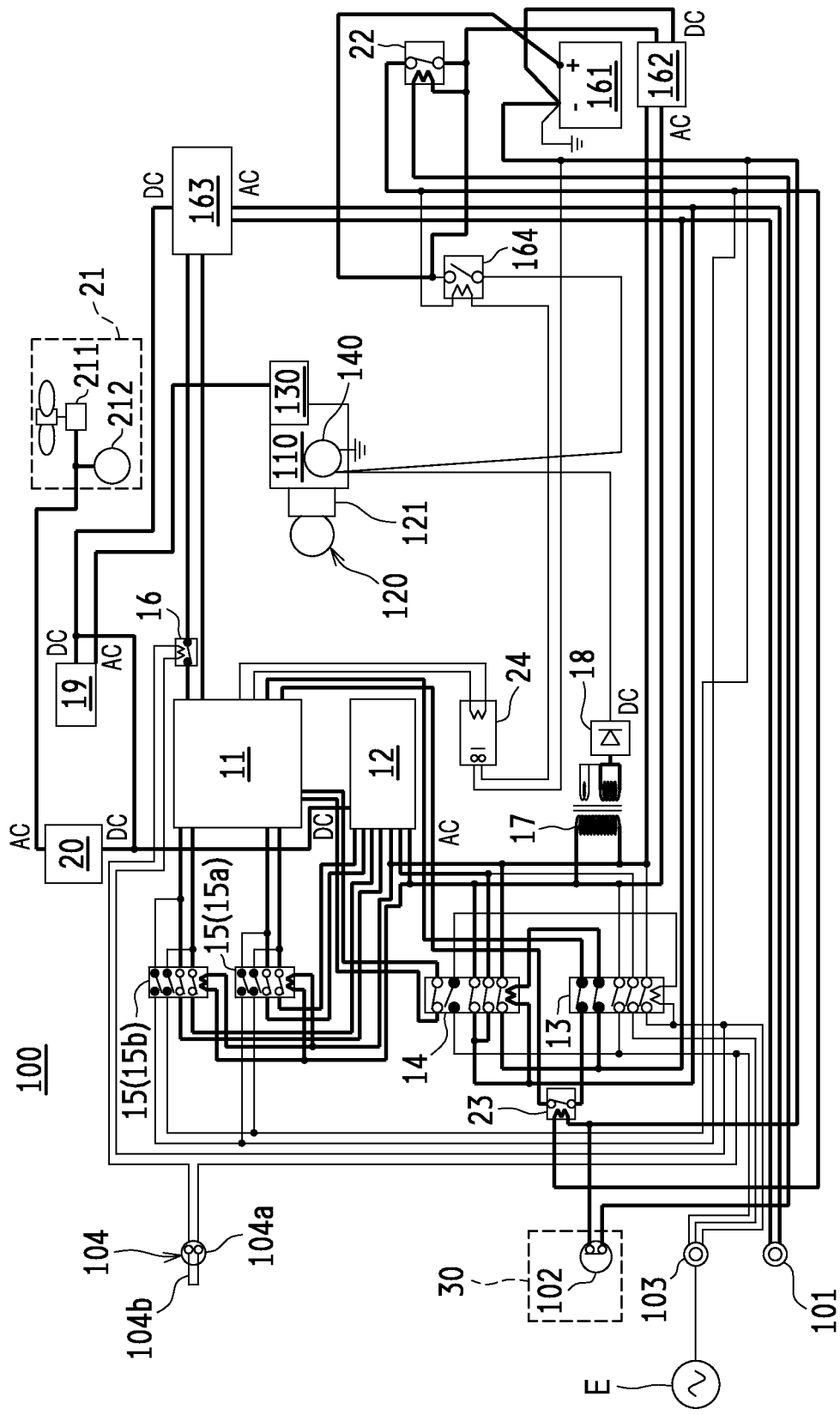
FIG. 15 is a circuit diagram in which the wiring of the circuit constitution associated with the circuit operations during the self-sustaining operation is represented in a thick line, with respect to the circuit constitution of the engine driven heat pump illustrated in FIG. 14.

FIG. 15 is a circuit diagram in which the wiring of the circuit constitution associated with the circuit operations during the self-sustaining operation is represented in a thick line, with respect to the circuit constitution of the engine driven heat pump 100 illustrated in FIG. 14. Also, FIG. 16 is a circuit diagram in which the wiring of the circuit constitution associated with the circuit operations at the power restoration is represented in a thick line, with respect to the circuit constitution of the engine driven heat pump 100 illustrated in FIG. 14.

Figure 16:
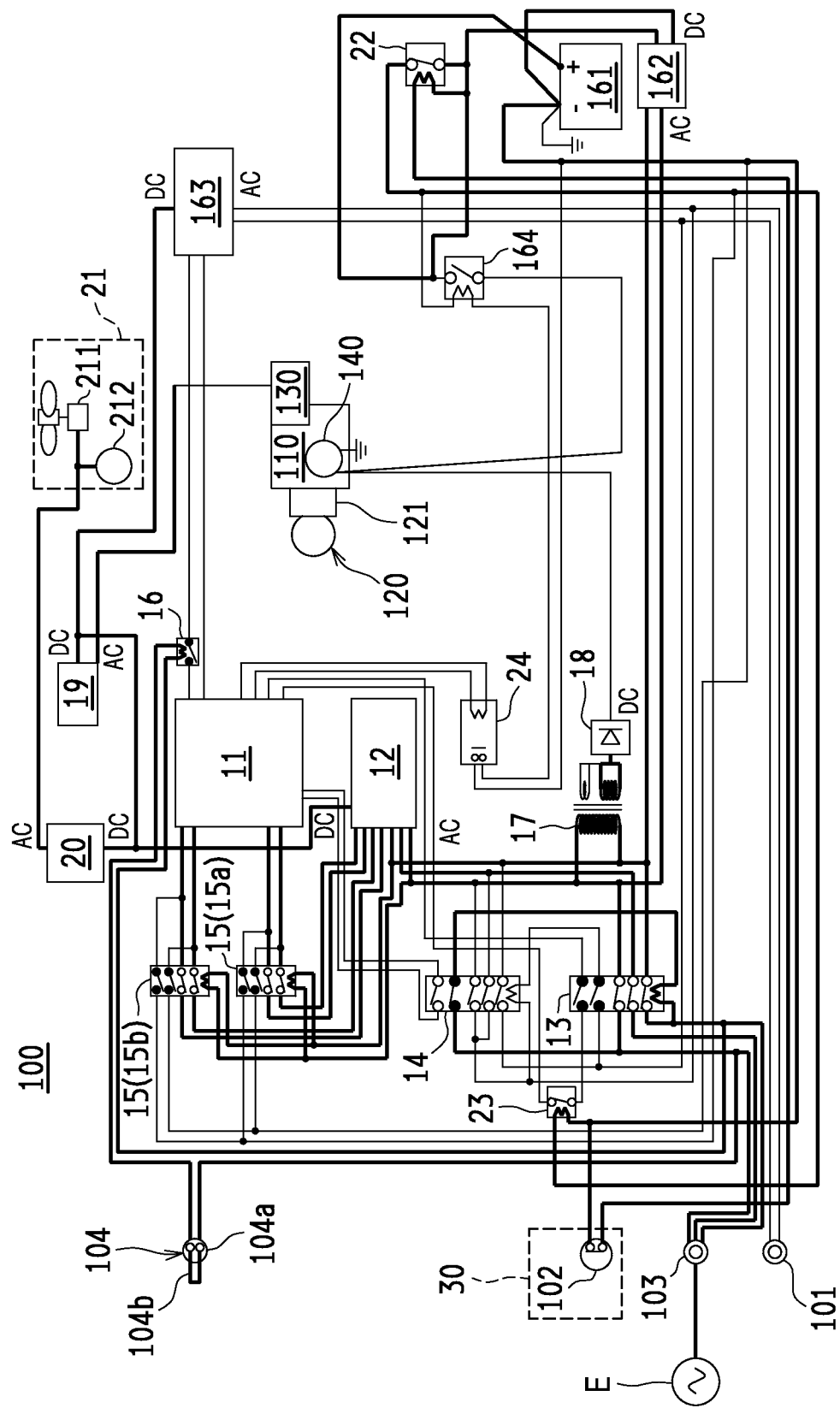
FIG. 16 is a circuit diagram in which the wiring of the circuit constitution associated with the circuit operations during power restoration is represented in a thick line, with respect to the circuit constitution of the engine driven heat pump illustrated in FIG. 14.

As described in FIG. 15, the engine driven heat pump 100 according to the second embodiment can transmit the output instruction signal from the control unit 11 to the inverter 163 during the self-sustaining operation in which the power of the system E is not restored, whereas, as described in FIG. 16, the engine driven heat pump 100 can cut off the transmission of the output instruction signal from the control unit 11 to the inverter 163 when the power of the system E is restored (during the supply of system power).

According to the engine driven heat pump 100 of the second embodiment, when the power is restored, the output instruction signal to the inverter 163 is turned off, and when the output power from the inverter 163 is interrupted, the connection between the inverter 163, and the power supply circuit 12 and the battery charging circuit 162 is cut off by means of the independent power supply relay 14, so that unintended self-sustaining operation and the continuous fuel consumption (gas consumption in the example) can be prevented during the power restoration.

In the example, the power restoration automatic stop conductive member 104 includes a connection terminal 104a and a short-circuit line 104b, and the connection terminal 104a is short-circuited by the short-circuit line 104b. The power restoration automatic stop conductive member 104 is not limited to the above-mentioned constitution, but may be a connection switch that connects or cuts off between the exciting coil of the power restoration relay 16 and the system E.

Herein, in a case where the power restoration automatic stop conductive member 104 includes the connection terminal 104a and the short-circuit line 104b, when the power restoration automatic stop conductive member 104 is opened by removing the short-circuit line 104b from the connection terminal 104a, or in a case where the power restoration automatic stop conductive member 104 is the connection switch, when the power restoration automatic stop conductive member 104 is opened by turning off the connection switch, the constitution of the electric circuit substantially becomes similar to that of the first embodiment illustrated in FIG. 3. Accordingly, when the user desires the constitution of the electric circuit of the first embodiment (the constitution in which the operation of the inverter 163 is stopped by the user's manual operation), the short-circuit line 104b can be removed from the connection terminal 104a in the case where the power restoration automatic stop conductive member 104 includes the connection terminal 104a and the short-circuit line 104b, or the connection switch can be turned off in the case where the power restoration automatic stop conductive member 104 is the connection switch.

Third Embodiment

Incidentally, regarding the engine driven heat pump 100 of the second embodiment, during the power restoration, the supply of the output power from the inverter 163 can be switched to the supply of the system power from the system E while the user keeps turning on the self-sustaining switch 102. However, in a state where the user forgets to turn off the self-sustaining switch 102, and the self-sustaining switch 102 is kept turned on, when the power is cut off again, the engine driven heat pump 100 is actuated without reflecting the user's intention. Also, in the state where the self-sustaining switch 102 is kept turned on during the power restoration (during the supply of the system power), notwithstanding that it is not necessary for the battery relay 22 and the self-sustaining input relay 23 to be excited, as illustrated at the time when the power is restored in FIG. 16, the battery relay 22 and the self-sustaining input relay 23 fall into the excited state, and the power is consumed as much. Also, when an independent actuation display lamp is provided, it is likely that the lighting of the lamp is misconstrued as the self-sustaining operation.

Accordingly, the engine driven heat pump 100 of the third embodiment is configured to self-hold an ON state of a self-holding-type self-sustaining switch 105 (another example of the self-sustaining switch) based on a user's operation, whereas the engine driven heat pump 100 is configured to automatically release the self-holding of the ON state of the self-holding-type self-sustaining switch 105 when the power is restored.

Figure 17:
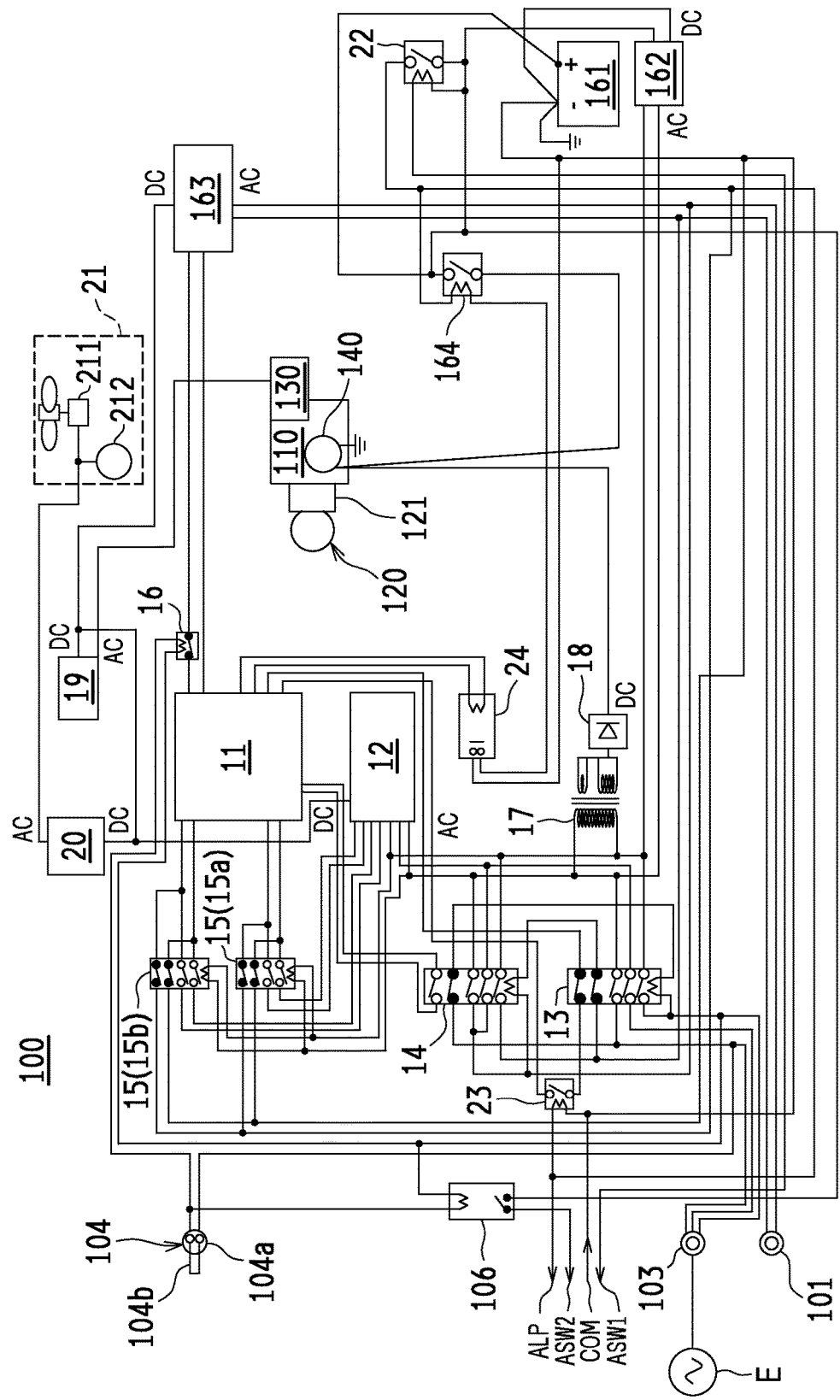
FIG. 17 is a detailed diagram of the electric circuit of the engine driven heat pump according to a third embodiment.

FIG. 17 is a detailed diagram of the electric circuit of the engine driven heat pump 100 according to the third embodiment. Also, FIG. 18 is a detailed diagram illustrating the essential part of the electric circuit of the engine driven heat pump 100 according to the third embodiment.

Figure 18:
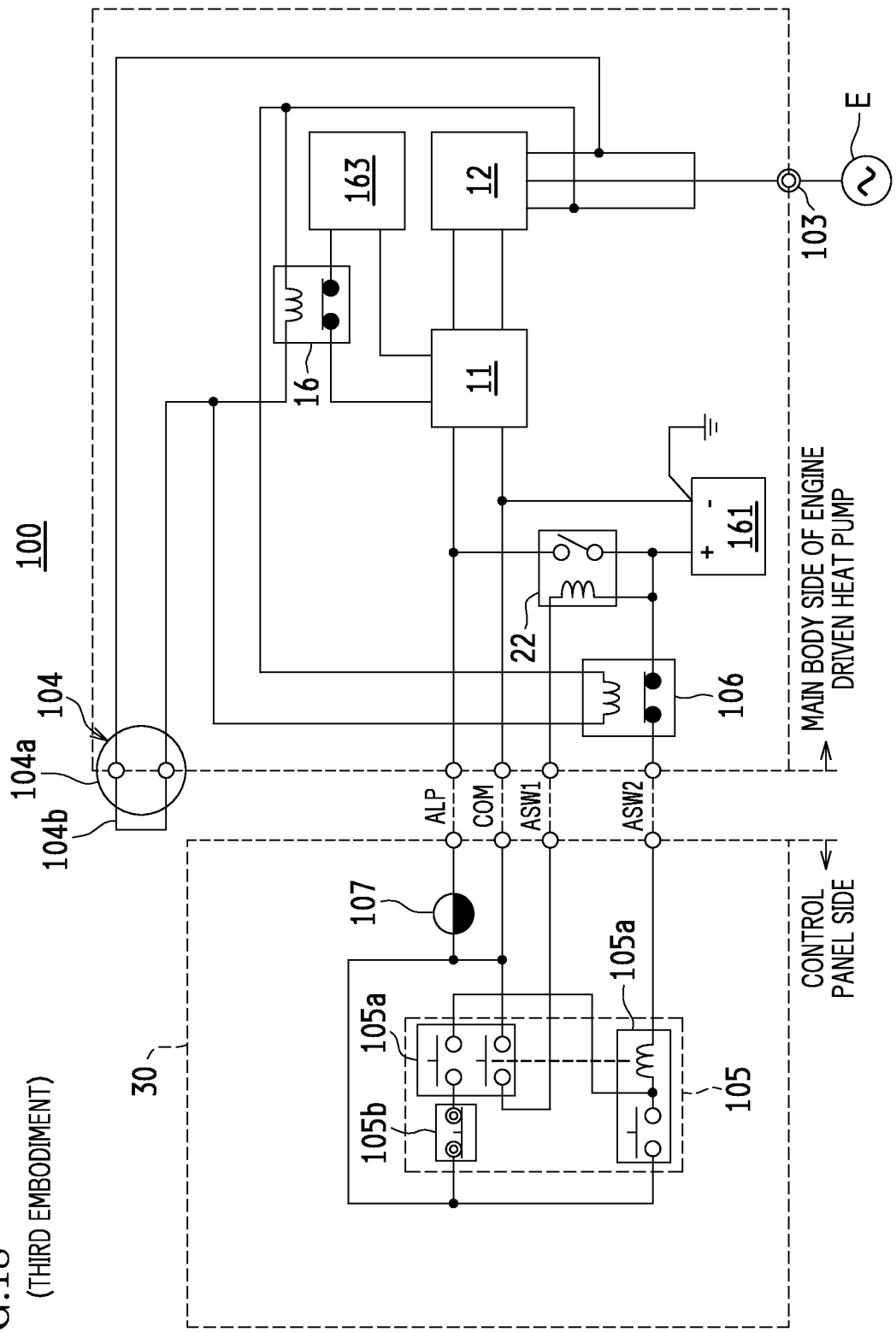
FIG. 18 is a detailed diagram illustrating the essential part of the electric circuit of the engine driven heat pump according to the third embodiment.

The self-holding-type self-sustaining switch 105 and the switch return relay 106 are provided in the engine driven heat pump 100 according to the third embodiment, illustrated in FIGS. 17 and 18, in place of the self-sustaining switch 102 of the engine driven heat pump 100 according to the second embodiment.

With respect to the engine driven heat pump 100 according to the third embodiment, the same numbers of the engine driven heat pump 100 according to the second embodiment are designated as the same references, and thereby duplicated descriptions are omitted.

It is noted that, the illustration of components is omitted in FIG. 18, except for the control unit 11, the power supply circuit 12, the power restoration relay 16, the battery relay 22, the system input unit 103, the power restoration automatic stop conductive member 104, the engine actuation battery 161, and the inverter 163, in addition to the self-holding-type self-sustaining switch 105 and the switch return relay 106, which are provided in place of the self-sustaining switch 102 of the second embodiment.

The self-holding-type self-sustaining switch 105 self-holds the ON state based on the ON operation by the user, whereas the system power from the system E is supplied, from the ON state, or the user performs the off operation, whereby the self-holding-type self-sustaining switch 105 is turned off and configured to maintain an OFF state. More particularly, the self-holding-type self-sustaining switch 105 automatically or manually switches the connection and cutoff between the engine actuation battery 161 and the control unit 11 and includes a function of automatically or manually switching on and off (presence and absence) of the self-sustaining signal indicating the self-sustaining operation. It is noted that the self-holding-type self-sustaining switch 105 can be operated from a control panel 30 in a house.

The self-holding-type self-sustaining switch 105 includes a self-holding-type switch 105a and a releasing switch 105b.

When any operation is not performed by the user, the self-holding-type switch 105a is configured to maintain the OFF state, whereas when the ON operation is performed by the user, the battery power from the engine actuation battery 161 is supplied to the exciting coil via the battery relay 22, and the self-holding-type switch 105a is configured to maintain the ON state.

The releasing switch 105b includes a function of manually switching the connection and cutoff between the engine actuation battery 161 and the exciting coil of the self-holding-type switch 105a. When any operation is not performed by the user, the releasing switch 105b is configured to maintain the ON state, whereas although the releasing switch 105b is in the OFF state by means of the OFF operation, when the OFF operation is released, the releasing switch 105b is configured to return to the ON state.

The switch return relay 106 is configured to connect with the engine actuation battery 161 and the self-holding-type self-sustaining switch 105, whereas the switch return relay 106 is configured to cut off the connection between the engine actuation battery 161 and the self-holding-type self-sustaining switch 105 during the power restoration (during the supply of the system power).

Specifically, the self-holding-type switch 105a includes three A contact points (○). The self-holding-type switch 105a turns on three A contact points (○) by means of the supply of power to the exciting coil, whereas the self-holding-type switch 105a includes not only a function of returning the three A contact points (○) to the OFF state by cutting off the supply of power to the exciting coil, but also a function of manually turning on the three A contact points (○) by means of the manual operation. The releasing switch 105b includes one manual contact point (illustrated by double circles in FIG. 18). The switch return relay 106 includes one B contact point (●).

The exciting coil of the battery relay 22 is connected to the engine actuation battery 161 via one A contact point (○) of the self-holding-type switch 105a of the self-holding-type self-sustaining switch 105. The exciting coil of the self-holding-type switch 105a is connected to the engine actuation battery 161 via the B contact point (●) of the switch return relay 106, another A contact point (○) of the self-holding-type switch 105a, and the manual contact point (double circles) of the releasing switch 105b of the self-holding-type self-sustaining switch 105, and connected to the engine actuation battery 161 via the B contact point (●) of the switch return relay 106 and another A contact point (○) of the self-holding-type switch 105a. The exciting coil of the switch return relay 106 is connected to the system E via the power restoration automatic stop conductive member 104. Also, an independent actuation display lamp 107 is connected to the engine actuation battery 161 via the A contact point (○) of the battery relay 22.

(Self-Holding State)

Figure 19:
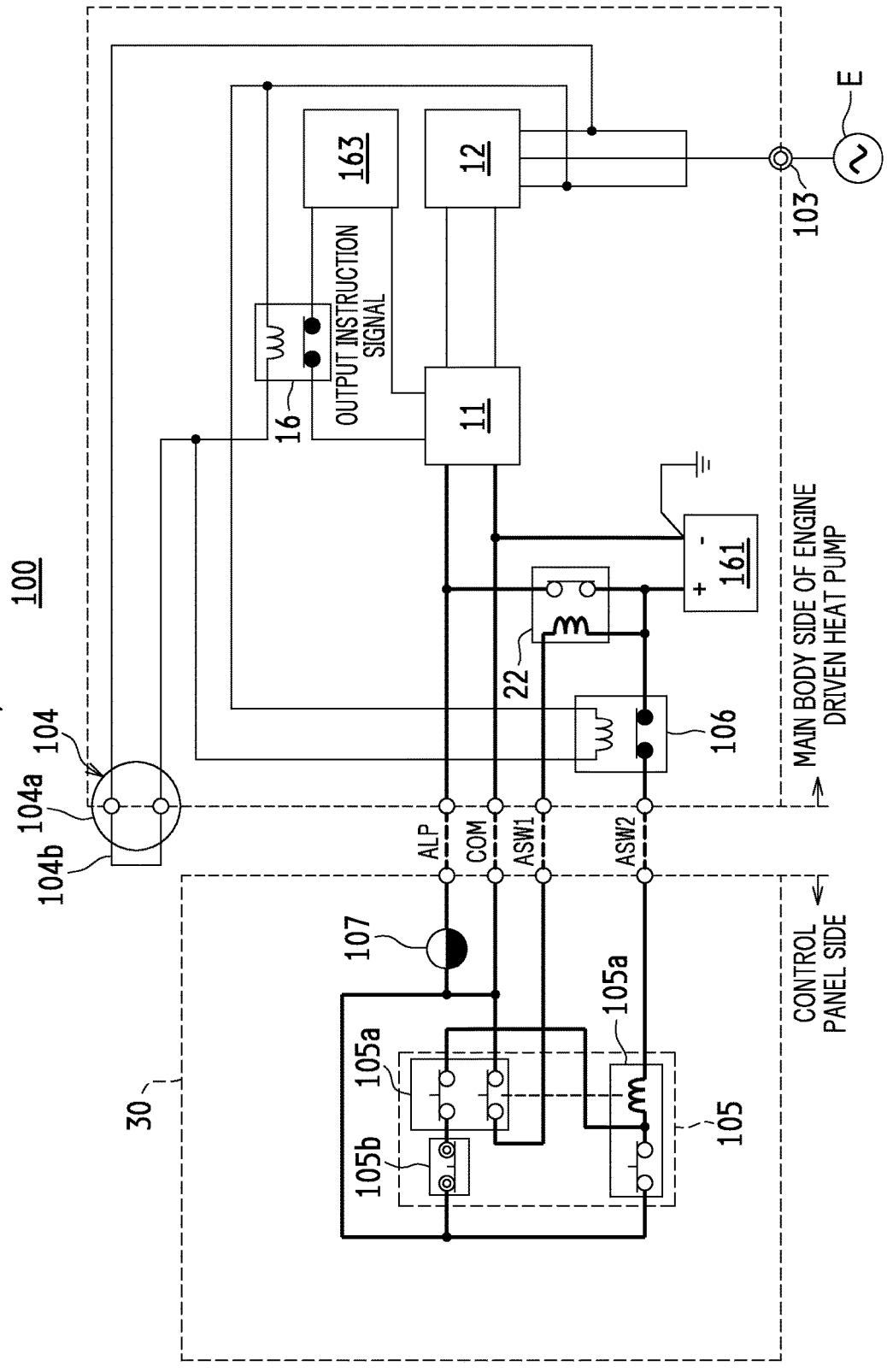
FIG. 19 is a circuit diagram in which the wiring of the circuit constitution associated with the circuit operations is represented in a thick line, wherein with respect to the circuit constitution of the engine driven heat pump illustrated in FIG. 18, the self-holding-type switch of a self-holding-type self-sustaining switch is manually turned on, and the self-holding-type self-sustaining switch is in a self-holding state.

FIG. 19 is a circuit diagram in which the wiring of the circuit constitution associated with the circuit operations is represented in a thick line, wherein with respect to the circuit constitution of the engine driven heat pump 100 illustrated in FIG. 18, the self-holding-type switch 105a of the self-holding-type self-sustaining switch 105 is manually turned on, and the self-holding-type self-sustaining switch 105 is in a self-holding state. It is noted that the manual contact point (double circles) of the releasing switch 105b is in the ON state in the circuit operation.

As illustrated in FIG. 19, regarding the engine driven heat pump 100 according to the third embodiment, when the user manually turns on the three A contact points (○) of the self-holding-type switch 105a of the self-holding-type self-sustaining switch 105 from a state where the power of the system E is cut off, the battery power from the engine actuation battery 161 is supplied to the exciting coil of the battery relay 22, and the A contact point (○) of the battery relay 22 is conducted. Also, regarding the engine driven heat pump 100, the battery power from the engine actuation battery 161 is supplied to the exciting coil of the self-holding-type switch 105a via the B contact point (●), which is in a conductive state with respect to the switch return relay 106, the two A contact points (○), which is in the ON state with respect to the self-holding-type switch 105a, and the manual contact point (double circles), which is in the ON state with respect to the releasing switch 105b, and the A contact point (○) of the self-holding-type switch 105a is conducted, and the ON state of the self-holding-type switch 105a is maintained, whereby the self-holding-type self-sustaining switch 105 falls into the self-sustaining state. Accordingly, the battery power from the engine actuation battery 161 is supplied to the power supply input port of the control unit 11 and the independent actuation display lamp 107.

Subsequently, after the establishment of the voltage of the generator 130 (when the voltage reaches a predetermined voltage or higher, or after a predetermined period of time has passed), the control unit 11 transmits the output instruction signal from the inverter output confirmation port to the signal input side of the inverter 163, thereby operating the inverter 163.

(Automatic Release of Self-Holding State)

Figure 20:
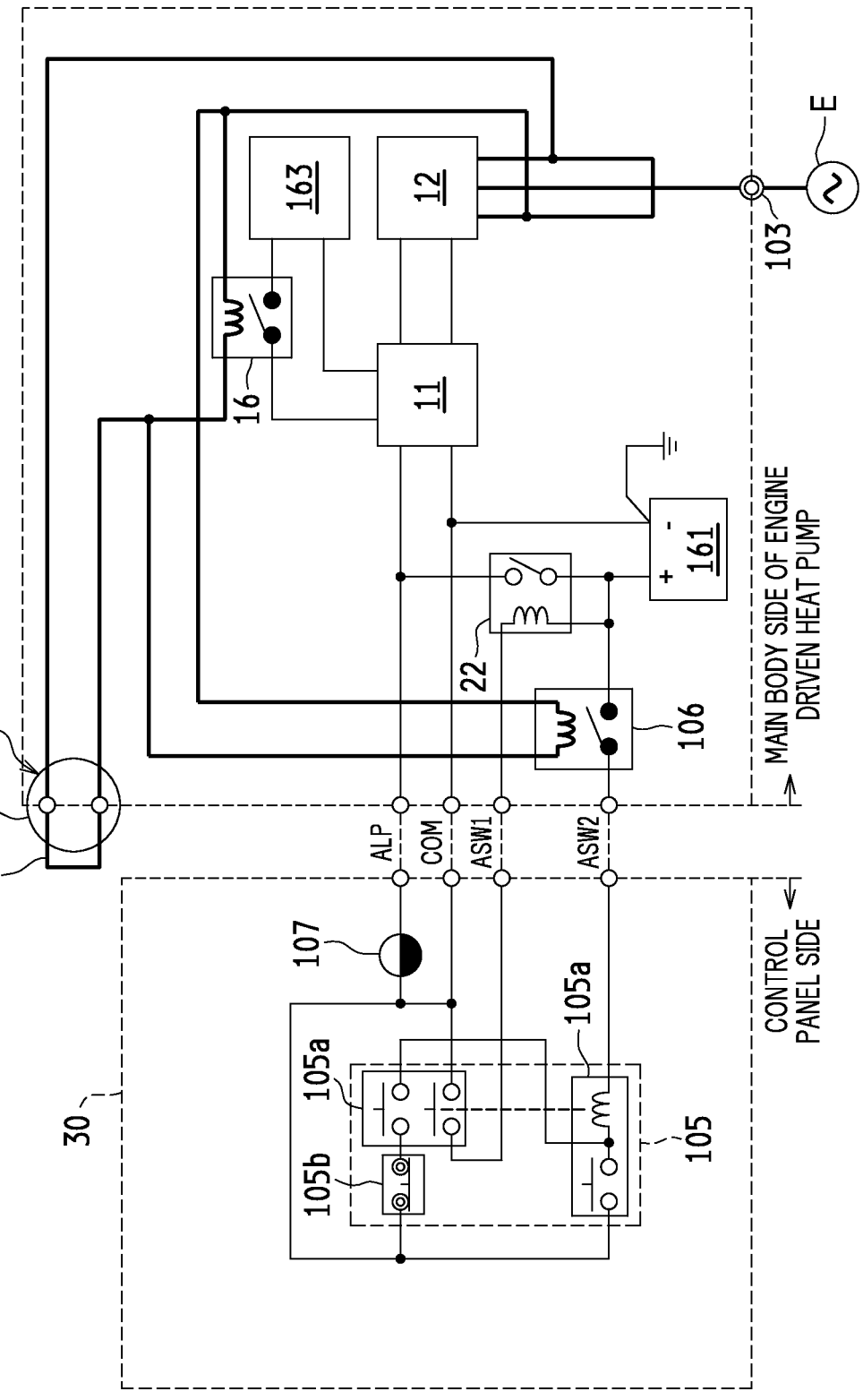
FIG. 20 is a circuit diagram in which the wiring of the circuit constitution associated with the circuit operations is represented in a thick line, wherein with respect to the circuit constitution of the engine driven heat pump illustrated in FIG. 18, when power is restored, the self-holding state of the self-holding-type self-sustaining switch is automatically released by the system power.

FIG. 20 is a circuit diagram in which the wiring of the circuit constitution associated with the circuit operations is represented in a thick line, wherein with respect to the circuit constitution of the engine driven heat pump 100 illustrated in FIG. 18, the self-holding state of the self-holding-type self-sustaining switch 105 is automatically released by the system power at the time when power is restored. It is noted that the manual contact point (double circles) of the releasing switch 105b is in the ON state in the circuit operation.

As illustrated in FIG. 20, when the system power from the system E is supplied by the power restoration to the exciting coil of the switch return relay 106, the B contact point (●) of the switch return relay 106 is in the non-conductive state, and the supply of the battery power is cut off from the engine actuation battery 161 to the exciting coil of the self-holding-type switch 105a, and the three A contact points (○) of the self-holding-type switch 105a are turned off, and the ON state of the self-holding-type switch 105a is released, and accordingly the self-holding state of the self-holding-type self-sustaining switch 105 is released. Consequently, the self-holding state of the self-holding-type self-sustaining switch 105 can be automatically turned off when the power is restored.

The engine driven heat pump 100 according to the third embodiment self-holds the self-holding-type self-sustaining switch 105, whereas the engine driven heat pump 100 automatically releases the self-holding of the self-holding-type self-sustaining switch 105 at the time when the power is restored, and after the power restoration, the unintended actuation of the engine driven heat pump 100 can be prevented even when the power is cut off again. Also, when the power is restored (when the system power is supplied), the self-holding-type self-sustaining switch 105 is automatically turned off, so that the excited state of the battery relay 22 and the self-sustaining input relay 23 can be released, and the power consumption can be restrained as much.

(Manual Release of Self-Holding State)

The engine driven heat pump 100 according to the third embodiment can manually release the self-holding state of the self-holding-type self-sustaining switch 105.

Figure 21:
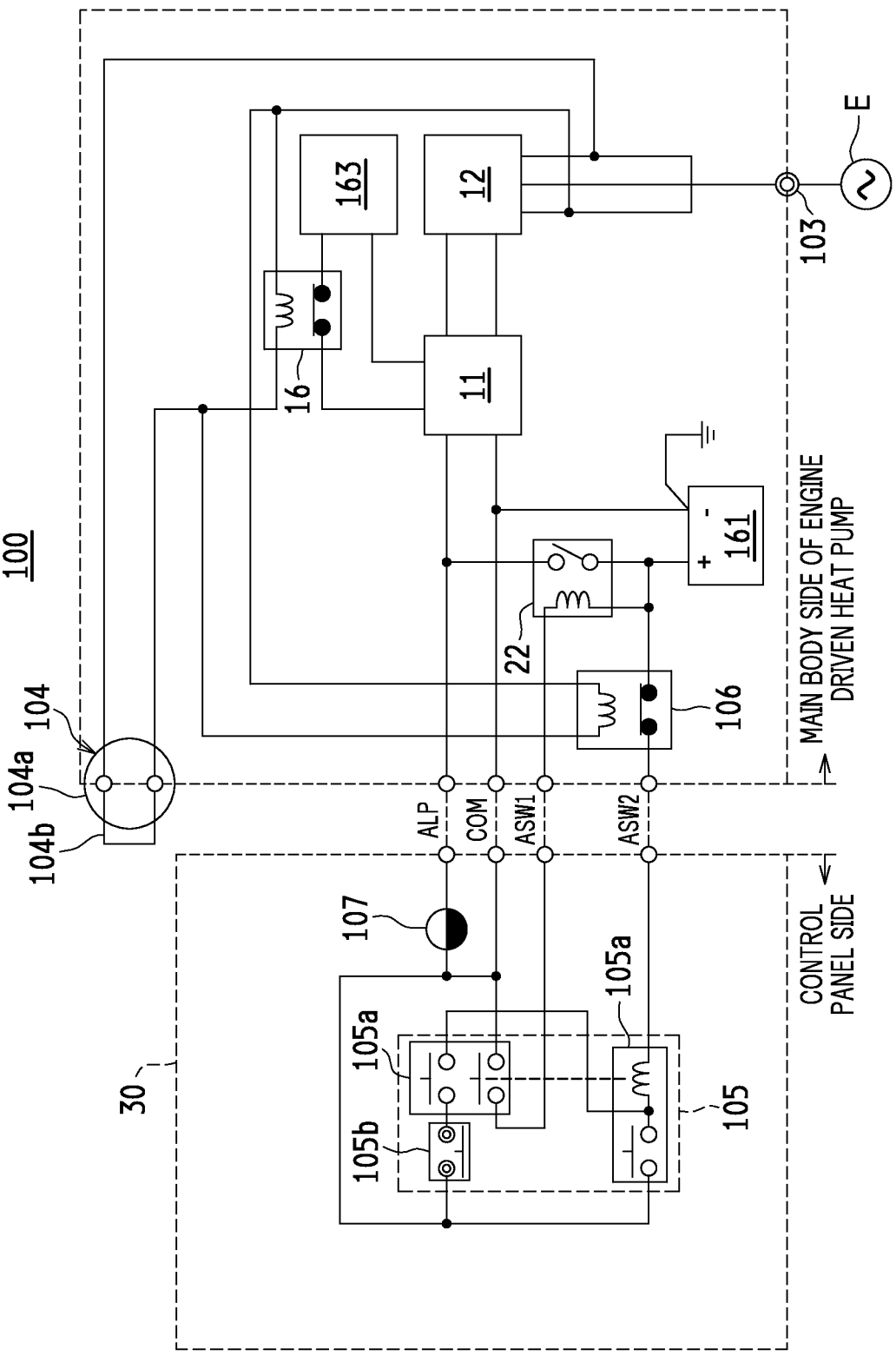
FIG. 21 is a circuit diagram illustrating the circuit constitution associated with the circuit operations, wherein with respect to the circuit constitution of the engine driven heat pump illustrated in FIG. 18, the self-holding state of the self-holding-type self-sustaining switch is manually released by the releasing switch of the self-holding-type self-sustaining switch during non-restoration of power.

FIG. 21 is a circuit diagram illustrating the circuit constitution associated with the circuit operations, wherein with respect to the circuit constitution of the engine driven heat pump 100 illustrated in FIG. 18, the self-holding state of the self-holding-type self-sustaining switch 105 is manually released by the releasing switch 105b of the self-holding-type self-sustaining switch 105 during the non-restoration of power.

As illustrated in FIG. 21, when the user manually performs the OFF operation with respect to the releasing switch 105b during the non-restoration of power in which the power of the system E is not restored, the manual contact point (double circles) of the releasing switch 105b is turned off, and the supply of the battery power is cut off from the engine actuation battery 161 to the exciting coil of the self-holding-type switch 105a, and the three A contact points (○) of the self-holding-type switch 105a are turned off, and the ON state of the self-holding-type switch 105a is released, and accordingly the self-holding state of the self-holding-type self-sustaining switch 105 is released. Consequently, the self-holding-type self-sustaining switch 105 can be manually turned off during the non-restoration of power.

The present invention is not limited to the above-mentioned embodiments, but can be executed in various forms. Accordingly, the embodiments disclosed above are mere exemplification in all the aspects, but shall not be regarded as the basis of limitative interpretation. The scope of the present invention shall be defined based on Claims, not restricted by the main paragraph of Description. Furthermore, all the modifications and changes, which are included within the scope of the equivalents to Claims, are included in the scope of the present invention.

The invention claimed is:

1. An engine driven heat pump, comprising:
an engine;
a compressor configured to be driven by the engine;
a refrigerant circuit configured to flow a refrigerant sucked and discharged by the compressor;
a generator configured to be driven by the engine;
an engine actuation battery configured to actuate the engine;
a battery charging circuit configured to charge the engine actuation battery;
an inverter configured to convert output power from the generator into a predetermined voltage and a predetermined frequency;

a power supply circuit configured to supply power to electric instruments in the engine driven heat pump;

a system cutoff relay configured to supply system power from a system to the power supply circuit and the battery charging circuit, whereas the system cutoff relay configured to cut off connection between the system and, the power supply circuit and the battery charging circuit during power failure;

an independent power supply relay configured to connect in parallel to the system cutoff relay with respect to the power supply circuit and the battery charging circuit and configured to supply output power from the inverter to the power supply circuit and the battery charging circuit during the power failure;

an engine starter configured to start the engine;

a starter relay configured to be connected between the engine starter and the engine actuation battery and supply battery power from the engine actuation battery to the engine starter;

a self-sustaining switch configured to manually switch ON and OFF of a self-sustaining signal indicating a self-sustaining operation; and an independent output unit configured to be connected in parallel to the independent power supply relay with respect to the inverter, wherein it is configured to switch to a self-sustaining mode at which the engine is driven, irrespective of a request of a heat pump operation, and wherein when the self-sustaining switch is turned on during the power failure, and the self-sustaining signal is received, it is configured to switch to the self-sustaining mode and bring the starter relay into conduction for a predetermined period of time, thereby starting the engine and the generator, and when the output power from the inverter is received after establishment of a voltage of the generator, it is configured to supply the output power from the inverter to the power supply circuit and the battery charging circuit by means of the independent power supply relay, and it is configured to supply the output power from the inverter to outside of the engine driven heat pump via the independent output unit, and wherein during supply of the output power from the inverter, it is configured to maintain cutoff with respect to the connection between the system, and the power supply circuit and the battery charging circuit by means of the system cutoff relay and maintain output of the output power from the inverter until the self-sustaining signal is interrupted, and wherein it is configured to recover the connection between the system, and the power supply circuit and the battery charging circuit by means of the system cutoff relay when power is restored and the output power from the inverter is interrupted.

2. The engine driven heat pump according to claim 1, wherein constitution is provided, in which when the power is restored, an output instruction signal to the inverter is turned off, and when the output power from the inverter is interrupted, the connection between the inverter, and the power supply circuit and the battery charging circuit is cut off by means of the independent power supply relay.

3. The engine driven heat pump according to claim 2, wherein it is configured to self-hold the self-sustaining switch, whereas it is configured to automatically release self-holding of the self-sustaining switch when the power is restored.

* * * * *